United States Patent
Mizuta

(10) Patent No.: US 8,723,012 B2
(45) Date of Patent: May 13, 2014

(54) COMPUTER-READABLE STORAGE MEDIUM HAVING INFORMATION PROCESSING PROGRAM STORED THEREIN, INFORMATION PROCESSING APPARATUS, INFORMATION PROCESSING SYSTEM, AND INFORMATION PROCESSING METHOD

(75) Inventor: Masato Mizuta, Kyoto (JP)

(73) Assignee: Nintendo Co., Ltd., Kyoto (JP)

( * ) Notice: Subject to any disclaimer, the term of this patent is extended or adjusted under 35 U.S.C. 154(b) by 147 days.

(21) Appl. No.: 13/418,707

(22) Filed: Mar. 13, 2012

(65) Prior Publication Data

US 2013/0112066 A1    May 9, 2013

(30) Foreign Application Priority Data

Nov. 9, 2011    (JP) .................................. 2011-245967

(51) Int. Cl.
*G10H 7/00*    (2006.01)

(52) U.S. Cl.
USPC .................................. 84/615; 84/600; 84/653

(58) Field of Classification Search
USPC .................................. 84/600–602, 615, 653
See application file for complete search history.

(56) References Cited

U.S. PATENT DOCUMENTS

| | | | | |
|---|---|---|---|---|
| 5,585,584 | A * | 12/1996 | Usa | 84/600 |
| 6,150,947 | A * | 11/2000 | Shima | 340/692 |
| 7,060,885 | B2 * | 6/2006 | Ishida et al. | 84/626 |
| 2007/0186759 | A1 * | 8/2007 | Bang et al. | 84/723 |
| 2009/0073175 | A1 * | 3/2009 | Matsumoto et al. | 345/467 |
| 2010/0182235 | A1 * | 7/2010 | Niikura et al. | 345/158 |
| 2012/0010778 | A1 * | 1/2012 | Akatsuka | 701/33 |
| 2012/0059494 | A1 * | 3/2012 | David | 700/94 |
| 2012/0103168 | A1 * | 5/2012 | Yamanouchi | 84/723 |
| 2012/0111179 | A1 * | 5/2012 | Yamanouchi | 84/723 |
| 2013/0239785 | A1 * | 9/2013 | Tabata | 84/609 |

OTHER PUBLICATIONS

Nintendo Co., Ltd., "WiiMusic", The Instruction Manual for Wii Software, (Oct. 16, 2008), pp. 10 and 11, with a partial English translation.

* cited by examiner

*Primary Examiner* — David S. Warren
(74) *Attorney, Agent, or Firm* — Nixon & Vanderhye P.C.

(57) ABSTRACT

An information processing program executed by a computer of an information processing apparatus that performs processing based on an input from an input device including an acceleration sensor and an angular velocity sensor, is provided, and the information processing program causes the computer to function to set a combined speed indicating a speed based on a movement of the input device, by using acceleration data outputted by the acceleration sensor, and angular velocity data outputted by the angular velocity sensor; and to execute a predetermined process based on the combined speed having been set.

17 Claims, 13 Drawing Sheets

F I G. 2
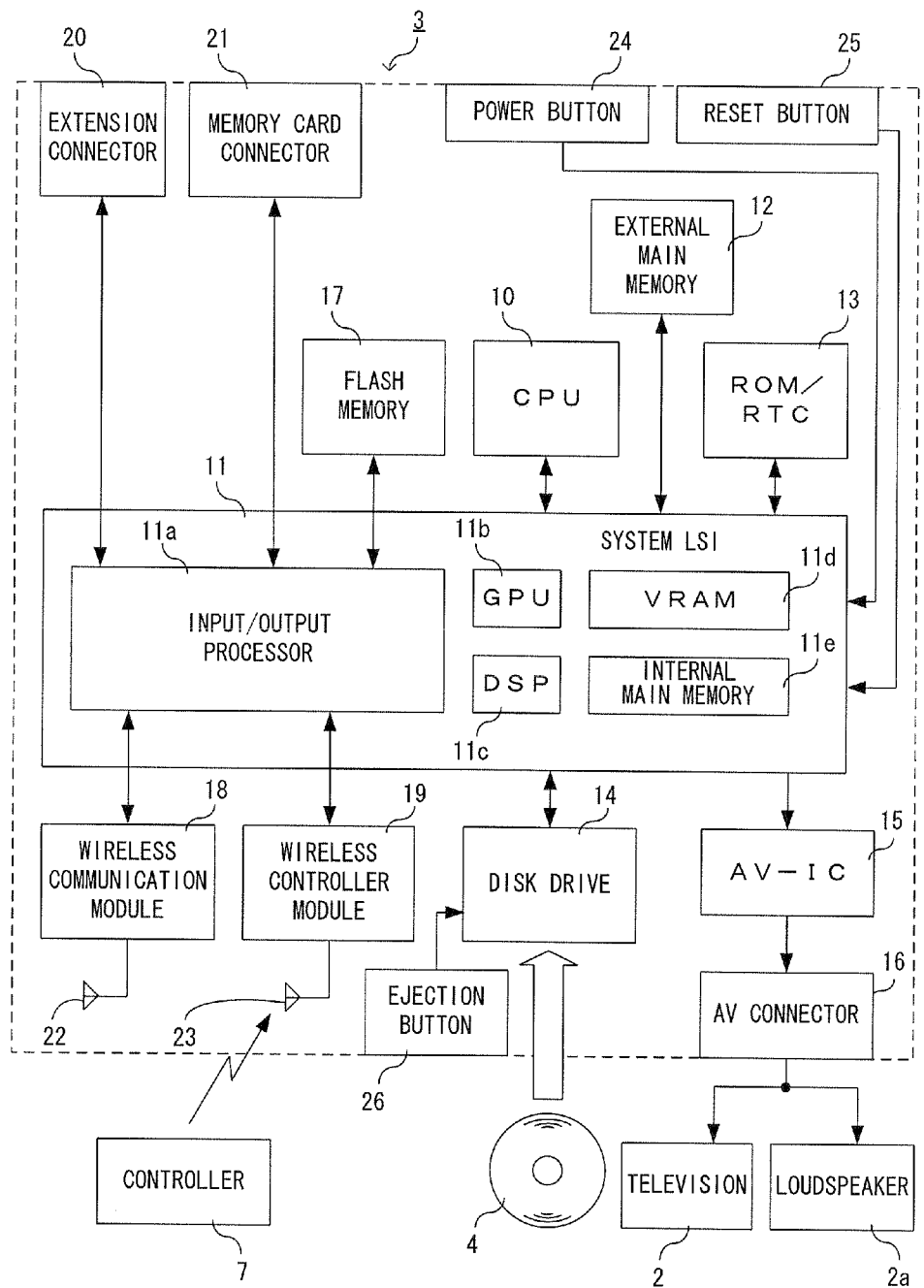

REAL SPACE COORDINATE
SYSTEM BASED ON PLAYER

REAL SPACE COORDINATE
SYSTEM BASED ON PLAYER

F I G. 1 5
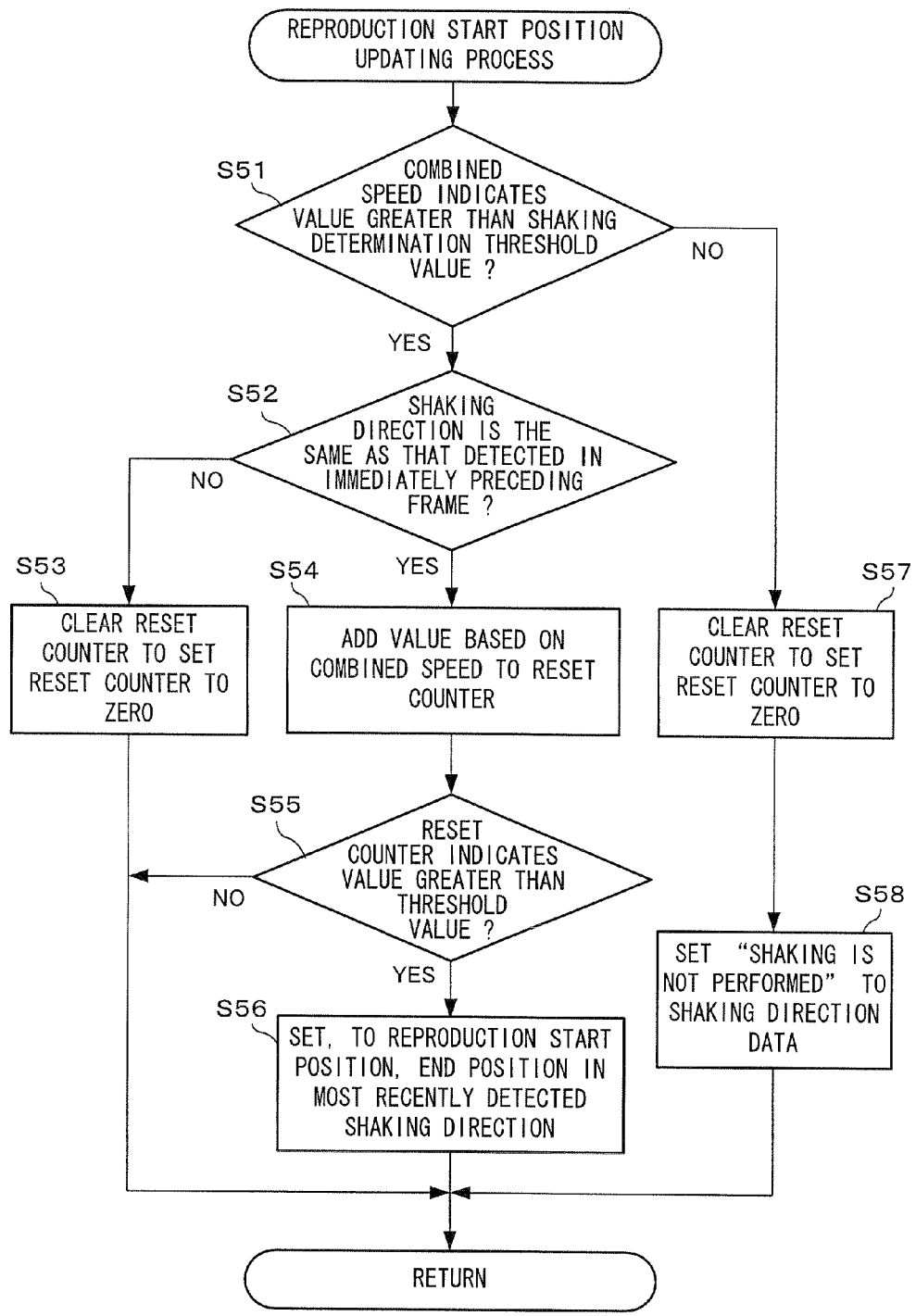

COMPUTER-READABLE STORAGE MEDIUM HAVING INFORMATION PROCESSING PROGRAM STORED THEREIN, INFORMATION PROCESSING APPARATUS, INFORMATION PROCESSING SYSTEM, AND INFORMATION PROCESSING METHOD

CROSS REFERENCE TO RELATED APPLICATION

The disclosure of Japanese Patent Application No. 2011-245967, filed on Nov. 9, 2011, is incorporated herein by reference.

FIELD

The exemplary embodiments relate to information processing, and more particularly to processing based on movement of an input device including an acceleration sensor and an angular velocity sensor.

BACKGROUND AND SUMMARY

Technology for virtually executing music performance based on movement of an input device including an acceleration sensor has been known to date. In this technology, movement (shaking) of the input device is detected by using an acceleration sensor, and moving (shaking) the input device once in a predetermined direction is handled as an action for one stroke in the case of a guitar, and as an operation for one hit (operation for one beating) in the case of a percussion instrument, thereby executing virtual performance of a musical instrument.

In the technology as described above, when the input device is moved in a predetermined direction, music performance for one stroke is executed in the case of a guitar, and music performance for one hit is executed in the case of a percussion instrument. Namely, detection of movement of the input device in the predetermined direction is used for determining a time at which the music performance (operation) for one stroke of a guitar is started, or a time at which the music performance (operation) for hitting a percussion instrument once is started. This is not substantially different from a manner in which a time at which the above-described operation is started is determined based on detection of an input using a button, and minute music performance operation based on variable movement cannot be executed.

Therefore, a feature of the exemplary embodiments is to make available a computer-readable storage medium having stored therein an information processing program capable of executing an operation with enhanced minuteness, by an operation of moving an input device itself.

The illustrative embodiments may have the following features.

A computer-readable storage medium having stored therein an information processing program according to the exemplary embodiment is a computer-readable storage medium having stored therein an information processing program executed by a computer of an information processing apparatus that performs processing based on an input from an input device including an acceleration sensor and an angular velocity sensor. The information processing program causes the computer to function as: a combined speed settings section and a processor. The combined speed setting section is configured to set a combined speed indicating a speed based on a movement of the input device, by using acceleration data outputted by the acceleration sensor, and angular velocity data outputted by the angular velocity sensor. The processor is configured to execute a predetermined process based on the combined speed having been set by the combined speed setting section.

In the features described above, a predetermined process is executed according to a movement of the input device moved by a player, thereby enabling an operation to be performed with enhanced minuteness.

According to another feature of the exemplary embodiment, the combined speed setting section may change a rate of the acceleration data to be used in the combined speed, according to a magnitude of an angular velocity represented by the angular velocity data, to set the combined speed.

In the features described above, even in a case where the input device is moved at a low angular velocity, an acceleration is used in a complementary manner, so that the combined speed can be set according to a movement of the input device.

According to still another feature of the exemplary embodiment, the combined speed setting section may set the combined speed such that the less a value of the angular velocity data is, the greater a rate of the acceleration data to be used in the combined speed is.

In the features described above, even when a manner, such as a parallel shifting manner, in which the input device is moved at a low angular velocity, is used, the combined speed can be set according to a movement of the input device.

According to still another feature of the exemplary embodiment, the information processing program causes the computer to further function as a music data storing section configured to store music data to be reproduced, and the processor may include a reproduction controller configured to reproduce the music data based on the combined speed having been set by the combined speed setting section.

In the features described above, a reproduction speed of a music can be changed according to a movement of the input device moved by a player. Therefore, in information processing for, for example, causing a player to perform an operation for playing the stringed instrument, the player is allowed to perform a music performance operation with a favorable minuteness.

According to still another feature of the exemplary embodiment, the information processing program causes the computer to further function as a reproduction start position setting section configured to set a reproduction start position of the music data, based on the acceleration data and the angular velocity, data, and the reproduction controller may start to reproduce the music data from the reproduction start position having been set.

In the features described above, the reproduction start position of the music data can be determined according to a movement of the input device, thereby enabling a music performance operation to be performed with a favorable minuteness.

According to still another feature of the exemplary embodiment, the reproduction start position setting section may set, as the reproduction start position, one of a start end of the music data and a finish end of the music data.

In the features described above, in a case where, for example, a music performance operation for playing the musical instrument such as the harp is performed, the music performance can be started from any one of the ends of the harp.

According to still another feature of the exemplary embodiment, the reproduction start position setting section may set the reproduction start position based on the combined speed.

In the features described above, the reproduction start position of the music data can be determined according to a movement of the input device, thereby enabling a music performance operation to be performed with a favorable minuteness.

According to still another feature of the exemplary embodiment, the information processing program causes the computer to further function as a reproduction direction setting section configured to set a reproduction direction of the music data, based on the acceleration data and the angular velocity data, and the reproduction controller may reproduce the music data in the reproduction direction having been set by the reproduction direction setting section.

In the features described above, the reproduction direction (forward direction or reverse direction) for the music data can be changed according to a movement of the input device, thereby enabling a music performance operation to be performed with a favorable minuteness.

According to still another feature of the exemplary embodiment, the reproduction controller may include a reproduction speed setting section configured to set a reproduction speed at which the music data is reproduced, based on the combined speed.

In the features described above, the reproduction speed can be changed according to a speed at which the input device is moved, so that, when a user performs an operation for playing the musical instrument, the operation can be performed with a favorable minuteness.

According to still another feature of the exemplary embodiment, the combined speed setting section may repeatedly set the combined speed, and the reproduction speed setting section may repeatedly set the reproduction speed, based on the combined speed that is repeatedly set.

In the features described above, also while the music data is being reproduced, the reproduction speed can be changed according to a speed at which the input device is moved.

According to still another feature of the exemplary embodiment, the reproduction speed setting section may set the reproduction speed only when the reproduction speed that is set based on the combined speed is increased.

In the features described above, a player can be prevented from uncomfortably performing a music performance operation due to a music being heard in a state where sound reproduction interval varies, thereby allowing the player to enjoy the music performance operation in a comfortable manner.

According to still another feature of the exemplary embodiment, the information processing program causes the computer to further function as a reproduction stop determination section configured to determine whether or not reproduction of the music data being reproduced is to be stopped, based on the acceleration data and the angular velocity data, and the reproduction controller may determine, when the reproduction stop determination section determines that the reproduction of the music data is to be stopped, a reproduction stop position on the music data, based on the acceleration data and the angular velocity data, and stop the reproduction at the reproduction stop position having been determined.

In the features described above, in a case where, for example, an operation of playing the harp is performed, when the input device is vigorously shaken by a player, a series of sounds in a scale can be produced according to an inertia of the shaking operation, thereby allowing the player to enjoy the music performance operation in a comfortable manner.

According to still another feature of the exemplary embodiment, the information processing program causes the computer to further function as a reproduction condition determination section configured to determine whether or not a predetermined condition for reproducing a music is satisfied, and the reproduction controller may reproduce the music data while the reproduction condition determination section determines that the predetermined condition is satisfied.

In the features described above, in a case where, for example, the input device is moved at a low speed, production of a sound which is not needed can be prevented.

According to still another feature of the exemplary embodiment, the input device may further include a predetermined input section, the reproduction condition determination section may determine whether or not the input is performed on the predetermined input section, and the reproduction controller may reproduce the music data while the reproduction condition determination section determines that the input is performed on the predetermined input section.

In the features described above, for example, a sound is reproduced only when a predetermined button is pressed, thereby preventing production of a sound which is not needed.

According to still another feature of the exemplary embodiment, the music data may be data representing a musical score in which predetermined sounds are provided at regular intervals.

In the features described above, for example, a player is allowed to perform an operation for emulating a music performance of playing the stringed instrument such as the harp and the guitar (the strings are provided at regular intervals).

According to the exemplary embodiment, in information processing in which, for example, a player is allowed to perform an operation of playing the stringed instrument, the player is allowed to perform an operation with a favorable minuteness.

These and other objects, features, aspects, and advantages of exemplary embodiments will become more apparent from the following detailed description of the exemplary embodiments when taken in conjunction with the accompanying drawings.

BRIEF DESCRIPTION OF THE DRAWINGS

FIG. 2 is a block diagram showing a non-limiting exemplary configuration of a game apparatus 3;

FIG. 15 is a flow chart showing in detail a non-limiting exemplary reproduction start position updating process;

DETAILED DESCRIPTION OF NON-LIMITING EXAMPLE EMBODIMENTS

Hereinafter, an exemplary embodiment will be described with reference to the drawings.

[Overall Configuration of Game System]

Figure 1:
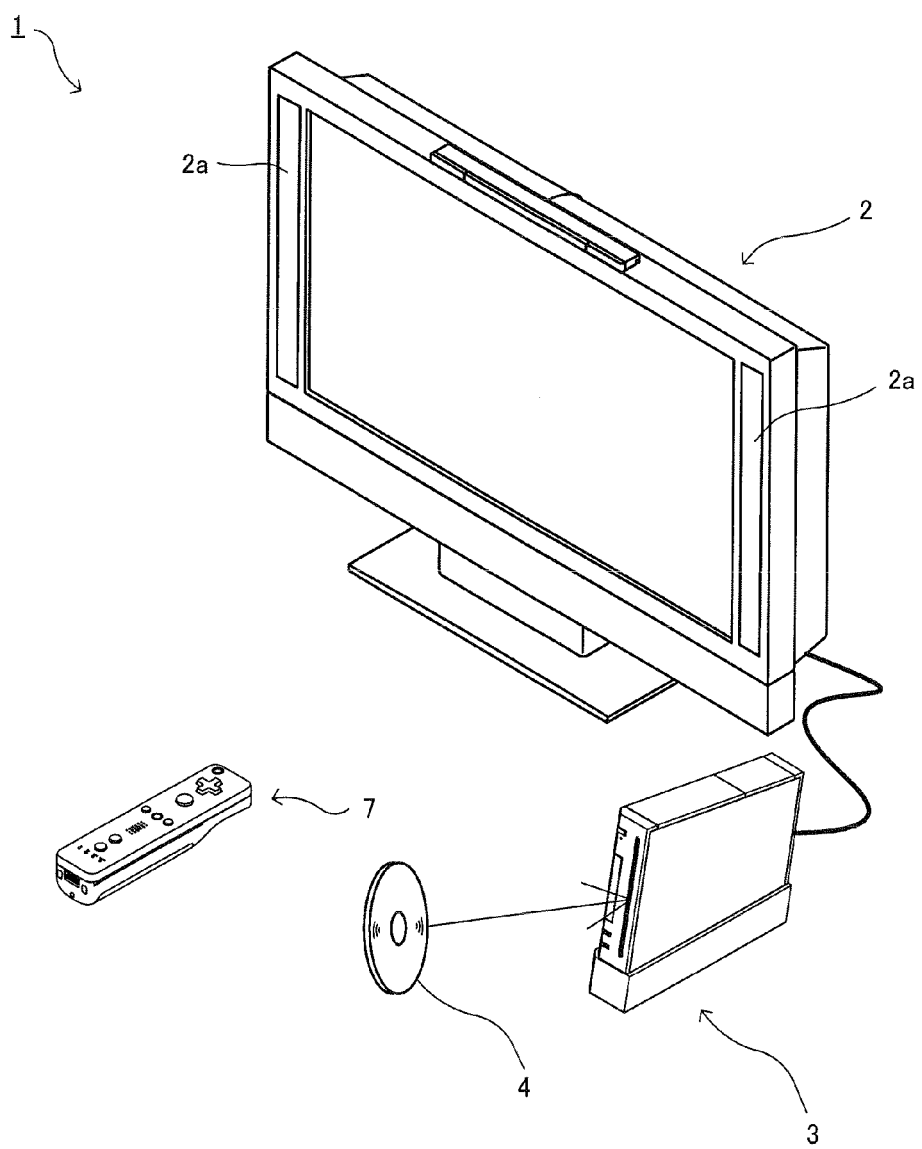
FIG. 1 shows a non-limiting exemplary outer appearance of a game system 1.

A game system 1 including a game apparatus typifying an information processing apparatus according to an exemplary embodiment will be described with reference to FIG. 1. FIG. 1 shows a non-limiting exemplary outer appearance of the game system 1. Hereinafter, the game apparatus and a game program of the exemplary embodiment will be described by using a stationary game apparatus as an example. As shown in FIG. 1, the game system 1 includes a television receiver (hereinafter, referred to simply as "television") 2, a game apparatus 3, an optical disc 4, and a controller 7. In the system of the exemplary embodiment described herein, a game process is executed by the game apparatus 3 based on a game operation using the controller 7

The optical disc 4, which is an exemplary exchangeable information storage medium used for the game apparatus 3, is detachably inserted in the game apparatus 3. A game program which is executed by the game apparatus 3 is stored in the optical disc 4. An insertion opening through which the optical disc 4 is inserted is provided on the front surface of the game apparatus 3. The game apparatus 3 reads and executes the game program stored in the optical disc 4 that has been inserted through the insertion opening, thereby executing the game process The game apparatus 3 is connected to the television 2, which is an exemplary display device, via a connecting cord. The television 2 displays a game image obtained as a result of the game process executed by the game apparatus 3.

The controller 7 provides the game apparatus 3 with operation data representing contents of an operation performed on the controller 7 itself. In the exemplary embodiment, the controller 7 and the game apparatus 3 are connected to each other by wireless communication. In the exemplary embodiment, for example, technology such as Bluetooth (registered trademark) is used for the wireless communication between the controller 7 and the game apparatus 3. In another exemplary embodiment, the controller 7 and the game apparatus 3 may be wire-connected.

[Internal Configuration of Game Apparatus 3]

Next, with reference to FIG. 2, an internal configuration of the game apparatus 3 will be described. FIG. 2 is a block diagram showing a non-limiting exemplary configuration of the game apparatus 3. The game apparatus 3 includes a CPU 10, a system LSI 11, an external main memory 12, a ROM/RTC 13, a disk drive 14, an AV-IC 15, and the like.

The CPU 10, which functions as a game processor, executes the game process by executing the game program stored in the optical disc 4. The CPU 10 is connected to the system LSI 11. In addition to the CPU 10, the external main memory 12, the ROM/RTC 13, the disk drive 14, and the AV-IC 15 are connected to the system LSI 11. The system LSI 11 performs processes such as control of data transfer among each component connected to the system LSI 11, generation of images to be displayed, and acquisition of data from external devices. The external main memory 12, which is a volatile memory, stores programs such as a game program loaded from the optical disc 4 and a game program loaded from a flash memory 17, and various data. The external main memory 12 is used as a work area and a buffer area for the CPU 10. The ROM/RTC 13 includes a ROM (so-called boot ROM) having incorporated therein a program for starting up the game apparatus 3, and a clock circuit (RTC: Real Time Clock) for counting time. The disk drive 14 reads program data, texture data, and the like from the optical disc 4, and writes the read data in the external main memory 12 or an internal main memory 11e.

Furthermore, the system LSI 11 is provided with an input/output processor (I/O processor) 11a, a GPU (Graphics Processor Unit) 11b, a DSP (Digital Signal Processor) 11c, a VRAM 11d, and the internal main memory 11e. Although not shown, these components 11a to 11e are connected to each other via an internal bus.

The GPU 11b, which is a portion of rendering means, generates an image according to a graphics command (rendering instruction) from the CPU 10. The VRAM 11d stores data (data such as polygon data and texture data) need by the GPU 11b for executing the graphics command. When an image is to be generated, the GPU 11b generates image data by using the data stored in the VRAM 11d.

The DSP 11c functions as an audio processor, and generates audio data by using sound data and sound waveform (tone) data stored in the internal main memory 11e and the external main memory 12.

The image data and audio data having been thus generated are read by the AV-IC 15. The AV-IC 15 outputs the read image data to the television 2 via an AV connector 16, and outputs the read audio data to a loudspeaker 2a built in the television 2. Thus, an image is displayed on the television 2 and sound is outputted from the loudspeaker 2a.

The input/output processor 11a performs data transmission to and data reception from components connected thereto, and downloads data from an external device. The input/output processor 11a is connected to the flash memory 17, a wireless communication module 18, a wireless controller module 19, an extension connector 20, and a memory card connector 21. The wireless communication module 18 is connected to an antenna 22, and the wireless controller module 19 is connected to an antenna 23.

The input/output processor 11a is connected to a network via the wireless communication module 18 and the antenna 22, and is capable of communicating with other game apparatuses and various servers connected to the network. The input/output processor 11a periodically accesses the flash memory 17 to detect for presence or absence of data to be transmitted to the network. If there is data to be transmitted, the input/output processor 11a transmits the data to the network through the wireless communication module 18 and the antenna 22. The input/output processor 11a receives data transmitted from the other game apparatuses or data downloaded from a download server, via the network, the antenna 22, and the wireless communication module 18, and stores the received data in the flash memory 17. The CPU 10 executes the game program to read the data stored in the flash memory 17 and use the read data on the game program. In the flash memory 17, in addition to data to be transmitted from the game apparatus 3 to the other game apparatuses and the various servers, and data received by the game apparatus 3 from the other game apparatuses and the various servers, saved data (game result data or game progress data) of a game played by using the game apparatus 3 may be stored.

Further, the input/output processor 11a receives operation data transmitted from the controller 7 via the antenna 23 and the wireless controller module 19, and (temporarily) stores the operation data in the buffer area of the internal main memory 11e or the external main memory 12.

Further, the extension connector 20 and the memory card connector 21 are connected to the input/output processor 11a. The extension connector 20 is a connector for an interface such as a USB and an SCSI. The extension connector 20 enables connection to a medium such as an external storage medium, and connection to a peripheral device such as another controller. Further, the extension connector 20 enables the game apparatus 3 to communicate with a network without using the wireless communication module 18, when connected to a connector for wired communication. The memory card connector 21 is a connector for connecting to an external storage medium such as a memory card. For example, the input/output processor 11a accesses the external storage medium via the extension connector 20 or the memory card connector 21, and can store data in the external storage medium or read data from the external storage medium.

The game apparatus 3 is provided with a power button 24, a reset button 25, and an ejection button 26. The power button 24 and the reset button 25 are connected to the system LSI 11. When the power button 24 is on, power is supplied to each component of the game apparatus 3 via an AC adaptor which is not shown. When the reset button 25 is pressed, the system LSI 11 restarts the boot program of the game apparatus 3. The ejection button 26 is connected to the disk drive 14. When the ejection button 26 is pressed, the optical disc 4 is ejected from the disk drive 14.

[Configuration of Controller 7]

Figure 3:
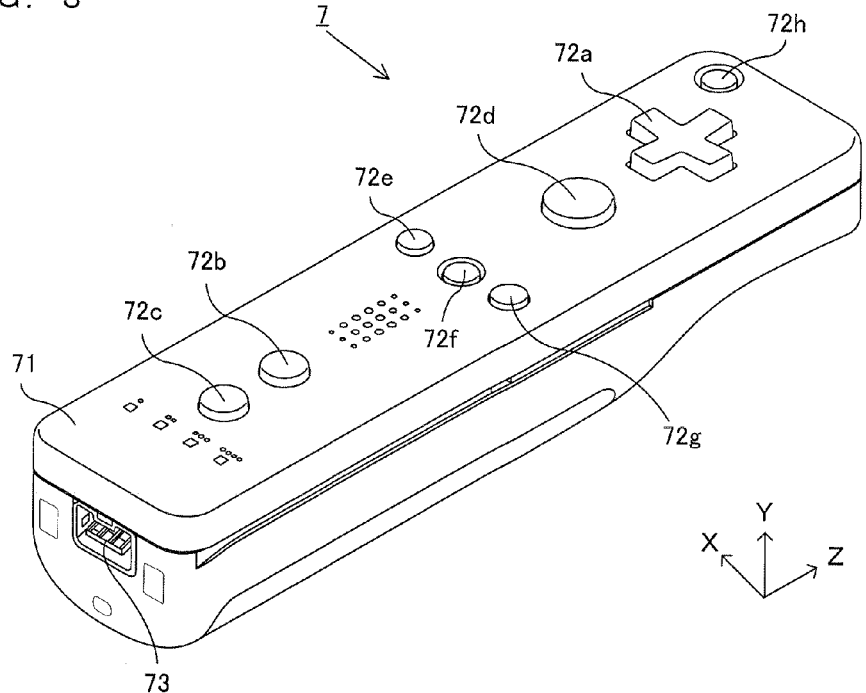
FIG. 3 is a perspective view showing a non-limiting exemplary outer structure of a controller 7.

Next, the controller 7 will be described with reference to FIG. 3. FIG. 3 is a perspective view showing a non-limiting exemplary outer structure of the controller 7. As shown in FIG. 3, the controller 7 includes a housing 71 formed by, for example, plastic molding. The housing 71 is generally shaped in a rectangular parallelepiped extending in a longitudinal direction which corresponds to the front-rear direction (Z-axis direction in FIG. 3). The overall size of the housing 71 is small enough to be held by one hand of an adult or even a child. A player is allowed to perform a game operation by pressing buttons on the controller 7, and moving the controller 7 itself to change the position and the orientation of the controller 7.

The housing 71 is provided with a plurality of operation buttons. As shown in FIG. 3, on the top surface of the housing 71, a cross button 72a, a first button 72b, a second button 72c, an A button 72d, a minus button 72e, a home button 72f, a plus button 72g, and a power button 72h are provided. Further, a recessed portion is formed on the bottom surface of the housing 71. A B button 72i is formed on a sloped surface of the rear portion of the recessed portion, which is not shown. These operation buttons 72a to 72i are assigned functions, respectively, based on the game program executed by the game apparatus 3, according to need. Further, the power button 72h is used for remotely powering on or off the game apparatus 3 body.

On the rear surface of the housing 71, a connector 73 is provided. The connector 73 is used for connecting another device to the controller 7.

Figure 4:
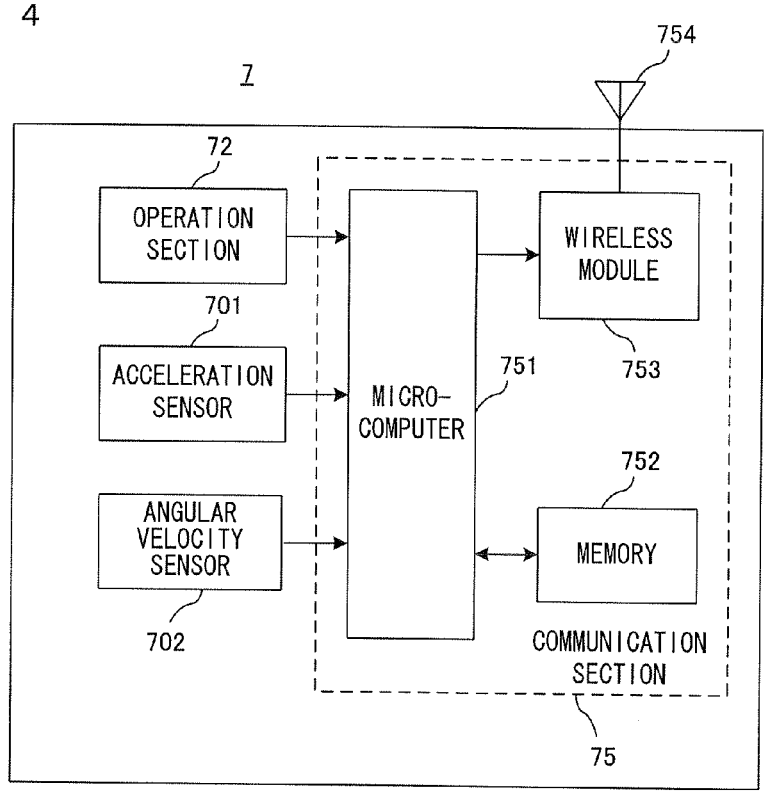
FIG. 4 is a block diagram showing a non-limiting exemplary structure of the controller 7.

FIG. 4 is a block diagram showing a non-limiting exemplary structure of the controller 7. The controller 7 includes the operation section 72 (operation buttons 72a to 72i), a communication section 75, an acceleration sensor 701, and an angular velocity sensor 702. The controller 7 transmits data representing the contents of the operation performed on the controller 7 itself, as operation data, to the game apparatus 3.

The operation section 72 includes the operation buttons 72a to 72i described above, and outputs, to a microcomputer 751 of the communication section 75, operation button data representing an input state of each of the operation buttons 72a to 72i (that is, indicating whether each of the operation buttons 72a to 72i has been pressed).

The communication section 75 includes the microcomputer 751, a memory 752, a wireless module 753, and an antenna 754. The microcomputer 751 controls the wireless module 753 for wirelessly transmitting, to the game apparatus 3, data obtained by the microcomputer 751 while using the memory 752 as a storage area during the processing.

The acceleration sensor 701 detects an acceleration (including a gravitational acceleration) of the controller 7. Namely, the acceleration sensor 701 detects a force (including the gravitational force) applied to the controller 7. The acceleration sensor 701 detects a value of the acceleration (linear acceleration) in the straight line direction along the sensing axis direction, among accelerations applied to the detection section of the acceleration sensor 701. For example, in the case of a multi-axis acceleration sensor having two or more axes, an acceleration of a component along each axis is detected as an acceleration applied to the detection section of the acceleration sensor. The acceleration sensor 701 is of an electrostatic capacitance type in the exemplary embodiment. However, another type of acceleration sensor may be used.

In the exemplary embodiment, the acceleration sensor 701 detects a linear acceleration in three axial directions, i.e., the up/down direction (the direction of the Y axis shown in FIG. 3), the left/rightward direction (the direction of the X axis shown in FIG. 3), and the forward/backward direction (the direction of the Z axis shown in FIG. 3) relative to the controller 7. The acceleration sensor 701 detects an acceleration in the straight line direction along each axis. Therefore, an output from the acceleration sensor 701 represents a value of a linear acceleration of each of the three axes. Namely, the detected acceleration is represented as a three-dimensional vector (ax, ay, az) of the XYZ-coordinate system (the controller coordinate system) defined relative to the controller 7. Hereinafter, a vector having, as components, the acceleration values which are associated with the three axes, respectively, and detected by the acceleration sensor 701, is referred to as an acceleration vector.

Data (acceleration data) representing an acceleration detected by the acceleration sensor 701 is outputted to the communication section 75 (the microcomputer 751). The acceleration detected by the acceleration sensor 701 is changed according to the orientation (tilt angle) and the movement of the controller 7 itself. Therefore, the game apparatus 3 is able to calculate the orientation and the movement of the controller 7, by using the acceleration data.

The angular velocity sensor 702 detects an angular velocity around each of the three axes (in the exemplary embodiment, the XYZ-axes). Data representing the angular velocity detected by the angular velocity sensor 702 is outputted to the microcomputer 751. Therefore, data representing the angular velocity around each of the three axes, that is, the XYZ-axes, is inputted to the microcomputer 751. The microcomputer 751 transmits the data representing the angular velocity around each of the three axes, as angular velocity data, to the game apparatus 3.

Further, in the exemplary embodiment, the three axes which are used by the angular velocity sensor 702 for detecting the angular velocities are set so as to match with the three axes (the XYZ-axes) which are used by the acceleration sensor 701 for detecting accelerations. This is because, in this case, calculation is facilitated in a process of the controller 7 for calculating an orientation. However, in another exemplary embodiment, the three axes which are used by the angular velocity sensor 702 for detecting the angular velocities may not match with the three axes which are used by the acceleration sensor 701 for detecting accelerations.

[Outline of Music Performance Process Executed by Game Apparatus 3]

Hereinafter, an outline of a music reproduction process (music performance process) execute by the game apparatus 3 will be described.

A game described in the exemplary embodiment is a game for operating a player object in a virtual space by moving the controller 7 itself. The process described in the exemplary embodiment is a process (hereinafter, referred to simply as a music performance process) for causing the player object to perform an action of playing the harp, and reproducing a music according to the action.

Figure 5:
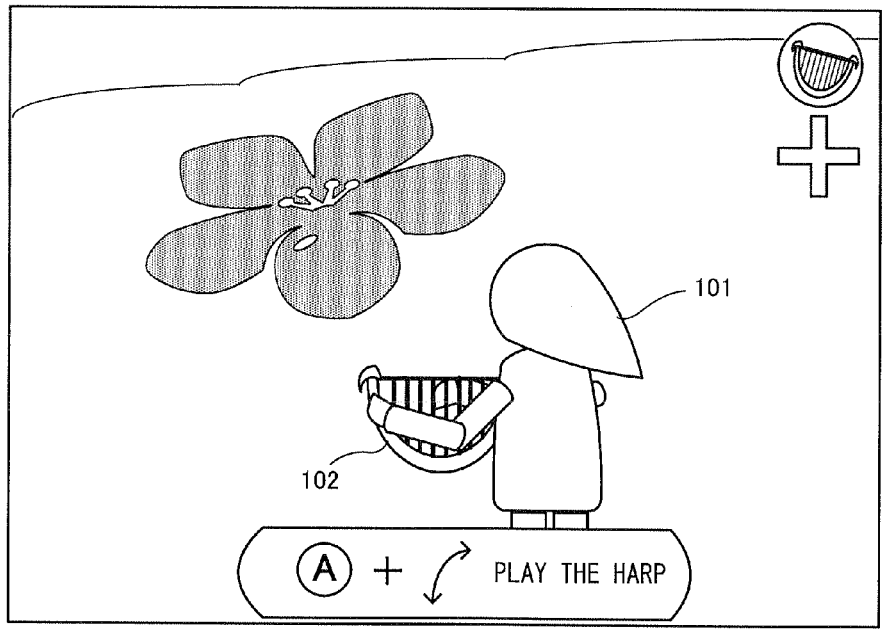
FIG. 5 shows a non-limiting exemplary game image.

FIG. 5 shows a non-limiting exemplary game image which is displayed when the player object plays the harp. In the game image shown in FIG. 5, a player object 101 holds a harp 102. In the exemplary embodiment, the harp 102 has twelve strings, and can produce twelve kinds of sounds.

Figure 6:
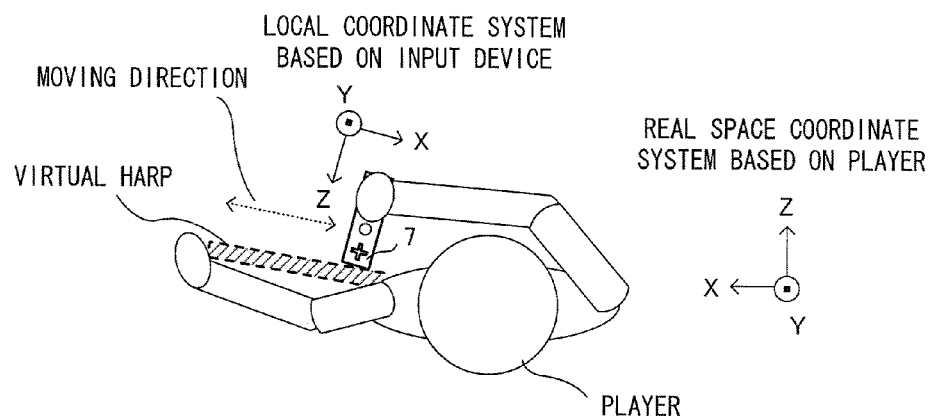
FIG. 6 shows a non-limiting exemplary posture of a player that is performing a music performance operation, and a non-limiting exemplary manner in which the controller 7 is held.

Next, an operation performed when the player object 101 plays the harp 102 will be described. Firstly, when the "upward direction" of the cross button 72a is pressed in a state where the player object 101 does not hold the harp 102 at the ready, in a predetermined scene of the game, the player object 101 holds the harp 102 at the ready with its left arm as shown in FIG. 5. In this state, the right hand of the player object 101 is positioned on a string of the harp 102. For example, a player poses in the same manner as the player object 101 (the player poses so as to hold the harp 102 at the ready with her/his left arm) (as shown in FIG. 6). The player moves her/his right hand with which the controller 7 is held while pressing the A button 72d as if the player plucks strings of the harp (the player shakes the controller 7). According thereto, the right arm of the player object 101 moves in a portion of the strings of the harp 102, and sound is outputted from the harp 102. Namely, the harp 102 can be played by the controller 7 itself being moved while the A button 72d is pressed (in other words, even if the controller 7 is moved in the case of the A button 72d being not pressed, no sound is outputted).

FIG. 6 is an overhead view schematically showing a non-limiting exemplary posture of a player that is performing the music performance operation, and a non-limiting exemplary manner in which the controller 7 is held. In FIG. 6, the forward/backward direction relative to the player is defined as the Z-axis direction. In the exemplary embodiment, description will be given based on a posture in which the harp is held by the left hand, and the right hand is moved to pluck the strings. An image of a posture and a motion that are actually made by a player is such that the player extends her/his left arm leftward relative to the player as if the player holds the harp with her/his left hand at the ready, as shown in FIG. 6. The player holds almost the lower half portion of the controller 7 with her/his right hand so as to orient the top surface of the controller 7 upward (in the Y-axis positive direction in a coordinate system of a real space). The player makes a motion so as to play the virtual harp by using the tip (the front surface of the housing 71) of the controller 7, to play the harp.

Figure 7:
FIG. 7 shows a non-limiting exemplary musical score for a harp.

Next, sounds outputted from the harp 102 in the music performance operation will be described. In the exemplary embodiment, twelve strings are defined for the harp 102 as described above. For example, as shown in FIG. 7, data (music data) of a musical score representing a sound row (sound sequence) of twelve notes is predefined. The notes of the musical score correspond to the tones of the strings, respectively, of the harp (in other words, a sound row of the twelve strings of the harp 102 is represented as a scale of the musical score). In the musical score, sound values (sound length of each note) of the respective notes are equal to each other.

In the exemplary embodiment, the notes of the musical score shown in FIG. 7 are reproduced by moving the controller 7. At this time, a reproduction speed (tempo), a reproduction position, and a reproduction direction for the each note of the musical score are controlled according to the movement of the controller 7. Consequently, the tone corresponding to each string of the harp 102 is outputted. For example, when a player moves the controller 7 leftward (in a direction in which the controller 7 is moved far from the player) in the posture as shown in FIG. 6, sounds of the notes in the musical score shown in FIG. 7 are sequentially reproduced in order starting from the leftmost sound. Namely, the notes of the musical score as shown in FIG. 7 are reproduced in the forward direction. Further, if, for example, the player stops moving her/his hand when reproduction up to the third sound from the left in the musical score shown in FIG. 7 has been made, the reproduction for the musical score is temporarily stopped. When the hand is moved again leftward from that position, reproduction is restarted from the fourth sound. On the other hand, when, for example, the controller 7 is moved rightward (in a direction in which the controller 7 approaches the player) on the assumption that the controller 7 is located at the leftmost position of the virtual harp in FIG. 6, sounds of the notes in the musical score shown in FIG. 7 are sequentially reproduced in order from the rightmost sound toward the leftmost sound. Namely, the notes of the musical score shown in FIG. 7 are reproduced in the reverse direction. Further, if the player stops moving her/his hand when, for example, (forward) reproduction up to the fifth sound from the left in the musical score shown in FIG. 7 has been made by the controller 7 being firstly moved leftward, the reproduction for the musical score is temporarily stopped. Thereafter, when her/his hand is moved (returned) rightward from that position corresponding to the fifth sound described above, reproduction in the reverse direction is made from the fifth sound toward the first sound.

Figure 8:
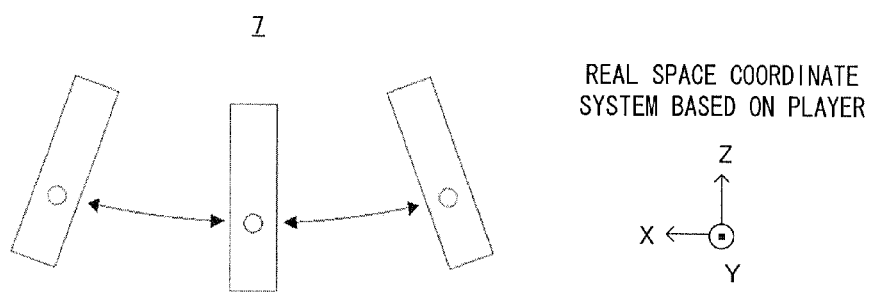
FIG. 8 shows a non-limiting exemplary manner in which the controller 7 is moved.
Figure 9:
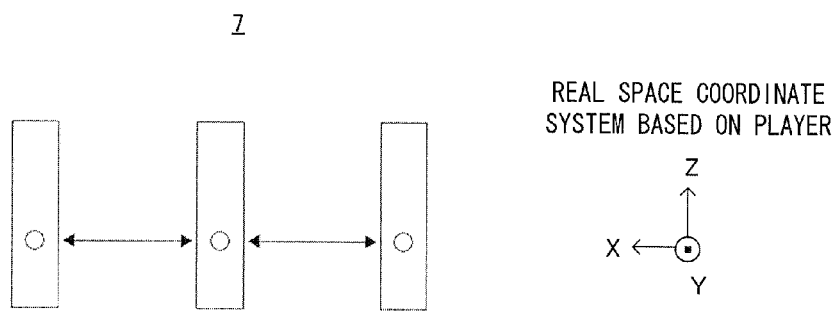
FIG. 9 shows another non-limiting exemplary manner in which the controller 7 is moved.

As an operation of moving (shaking) the controller 7 as described above, the following two main moving manners can be assumed. Firstly, as shown in FIG. 8, a manner may be assumed in which the controller 7 is moved by utilizing snap of a player's wrist as if the controller 7 is pivoted about the player's wrist. In this case, as viewed from the overhead, a trajectory of the movement of the controller 7 is formed so as to be almost sector-shaped as shown in FIG. 8. Hereinafter, this moving manner is referred to as a first moving manner. The other manner is a manner in which the controller 7 is shifted parallel, as shown in FIG. 9, by, for example, the entirety of the player's arm pivoting mainly about the player's shoulder or elbow. Hereinafter, this moving manner is referred to as a second moving manner. In an actual operation, it is assumed that these two manners are mixedly used depending on, for example, player' habits. For example, in a case where all the twelve sounds of the harp 102 are reproduced from right to left of the harp 102, some players may operate the controller 7 in the second moving manner from start to finish, whereas other players may operate the controller 7 in the first moving manner at the start of the operation, and then shift the moving manner to the second moving manner. Further, still other players may attempt reproduction of all of the twelve sounds by vigorously moving the controller 7 in the first moving manner.

As a detection manner for the movement (orientation) of the controller 7 by the two moving manners as described above, for example, a detection manner with the use of the acceleration sensor only, or a detection manner with the use of the angular velocity sensor only may be assumed. In the detection manner with the use of the acceleration sensor only, a movement that is great to some degree is easy to detect, whereas a low speed movement is difficult to detect. Further, it is difficult to determine a direction in which the controller 7 is being shaken. On the other hand, as the detection manner with the use of the angular velocity sensor only, for example, a manner in which movement of the controller 7 is detected based on change of an angular velocity of the controller 7 around the Y axis of a local coordinate system of the controller 7 may be used. In such a detection manner, when the movement is such that an angle is changed as in the first moving manner, the movement and the orientation are easy to detect. However, the detection manner with the use of the angular velocity data is not suitable for parallel shifting as in the second moving manner since change in angular velocity is small (in this case, detection is facilitated in the detection manner with the use of the acceleration data). Therefore, in the exemplary embodiment described herein, the acceleration sensor and the angular velocity sensor are used in combination so as to utilize advantages of both sensors, and a movement and an orientation of the controller 7, a speed at which the controller 7 is moved, a direction in which the controller 7 is shaken, and the like are detected in the music performance operation.

Further, in the exemplary embodiment, a process of determining a speed at which each note of the musical score shown in FIG. 7 is reproduced, according to a speed at which the controller 7 is moved (a speed at which the controller 7 is shaken), is executed. For example, when a speed at which the controller 7 is moved, is high, a reproduction speed, i.e., a tempo of the note of the musical score is enhanced.

Further, a direction in which the controller 7 is being shaken is detected, to determine a direction in which the notes of the musical score are reproduced. Namely, whether the strings of the harp are plucked from left to right, or from right to left, is determined, and, according to the direction, whether the notes of the musical score shown in FIG. 7 are to be reproduced in the forward direction or the reverse direction, is determined.

In order to realize the music performance operation as described above, the following process is generally executed in the exemplary embodiment described herein, which will be described below in detail. Firstly, a "combined speed" is calculated by using both the angular velocity data and the acceleration data. The "combined speed" represents a speed at which the controller 7 is being moved (shaken). Based on the "combined speed", the reproduction speed at which the note of the musical score is reproduced, is determined. When the "combined speed" indicates a value greater than or equal to a predetermined value, reproduction (i.e., music performance) of the note of the musical score is started. Further, a direction in which the notes are reproduced is also determined according to the "shaking direction" of the controller, which is obtained when the "combined speed" is calculated.

In the exemplary embodiment, as described above, only while the A button 72*d* is pressed, the sound of the harp 102 is reproduced. When the controller 7 is being moved without pressing the A button 72*d*, a reproduction start position is determined according to need. In the exemplary embodiment, the reproduction start position is set to one of the left end or the right end of the harp 102 (namely, one of the right end or the left end on the musical score shown in FIG. 7). Further, in the exemplary embodiment, an initial value of the reproduction start position is set to correspond to the left end position in the musical score shown in FIG. 7. For example, the controller 7 is moved leftward in the state shown in FIG. 6 without pressing the A button 72*d*, and when the movement distance indicates that the controller 7 has been moved almost halfway on the strings of the harp 102, it is predicted that the hand is being moved toward the left end of the harp 102, so that the reproduction start position is set to the right end position on the musical score shown in FIG. 7 (the left end of the virtual harp shown in FIG. 6).

Moreover, in the exemplary embodiment, in a case where the controller 7 is vigorously shaken to some degree, even if a distance over which the controller 7 is moved is small, the notes of the musical score shown in FIG. 7 are reproduced to the end. For example, a case where the controller 7 is not vigorously moved to any degree, and the controller is moved merely over a distance corresponding to a distance between the first sound to the fourth sound, to stop the reproduction at the fourth sound, in the musical score shown in FIG. 7, is assumed. In this case, if the controller 7 is vigorously shaken to some degree, even when the movement distance is equivalent to the distance between the first sound to the fourth sound in the case of the controller 7 being not vigorously shaken, the first sound to the twelfth sounds are all sequentially reproduced. Further, for example, whether the notes are to be reproduced to the end, or the notes are to be reproduced halfway is determined according to the degree of the vigorousness. For example, although the reproduction is stopped at the fourth sound when the vigorousness of the movement is small as described above, the reproduction of the first to the eighth sounds may be made to stop the reproduction, or the reproduction of the first to the twelfth sounds may be made to stop the reproduction, depending on the degree of the vigorousness. Further, the reproduction speed may be simultaneously determined, according to need, depending on the degree of the vigorousness.

[Details of Process Executed by Game Apparatus 3]

Figure 10:
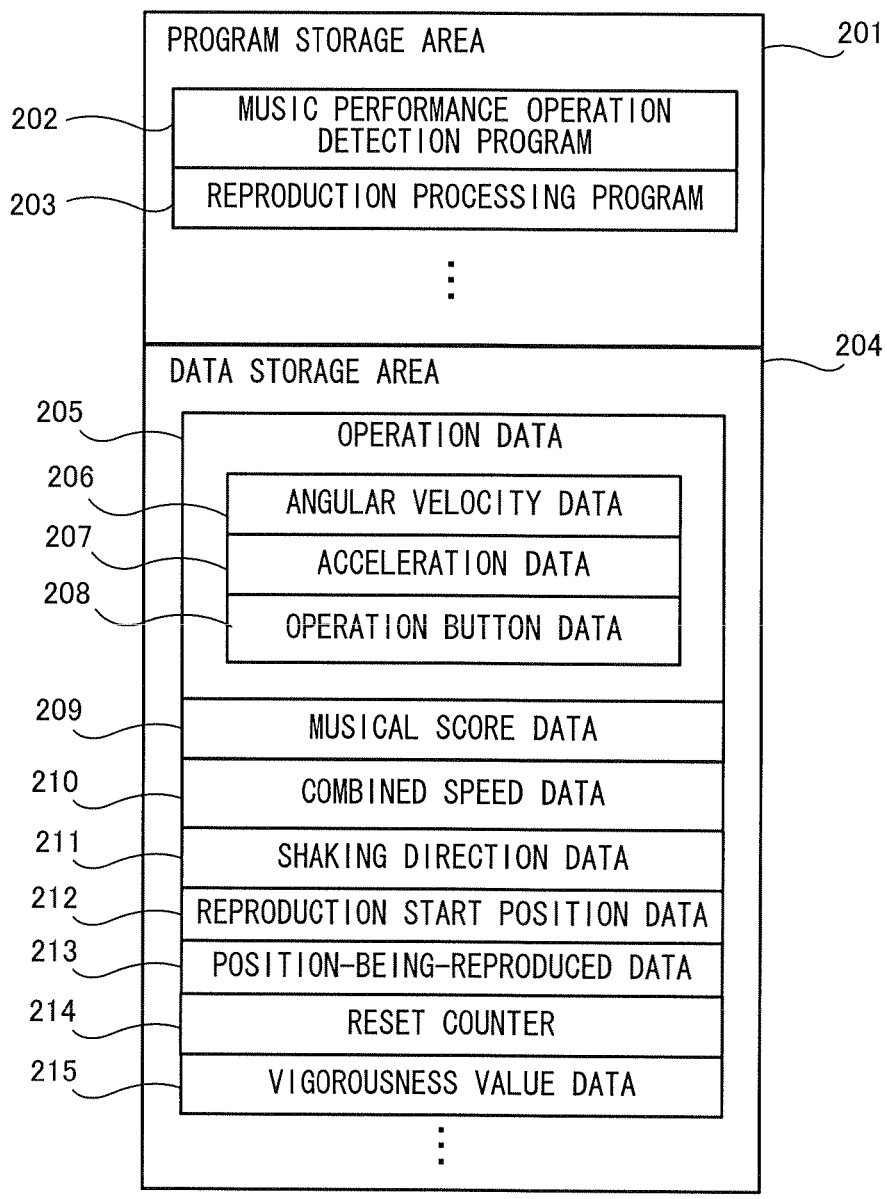
FIG. 10 shows a non-limiting exemplary memory map of an external main memory 12 of the game apparatus 3.

Next, the music performance process executed by the game apparatus 3 will be described in detail. Firstly, various data to be used in the music performance process will be described. FIG. 10 shows a non-limiting exemplary memory map of the external main memory 12 of the game apparatus 3. In FIG. 10, the external main memory 12 includes a program storage area 201 and a data storage area 204.

In the program storage area 201, a game program executed by the CPU 10 is stored, and the game program includes a music performance operation detection program 202, a reproduction processing program 203, and the like. The music performance operation detection program 202 is a program for executing a process of detecting an operation for playing the harp 102 as described above.

The reproduction processing program 203 is a program for a process of reproducing the notes of the musical score (musical score data 209 described below) as shown in FIG. 7. The reproduction processing program 203 is a program to be executed according to the music performance operation detection program 202 (the reproduction processing program 203 is instructed to execute various processes) according to need. The reproduction process of the reproduction processing program 203 is executed in parallel with the process of the music performance operation detection program 202. For example, when a "reproduction start instruction" is issued by the music performance operation detection program 202, a reproduction speed, a reproduction start position, a reproduction direction, and the like for the musical score are determined, in the reproduction process, with reference to various data described below, to start reproduction. Further, while the notes of the musical score are being reproduced, a position being currently reproduced is managed and controlled in the reproduction process. Further, during the reproduction, combined speed data 210 described below is referred to in each frame, and the reproduction speed is controlled, according to need, depending on the content of the combined speed data 210. Furthermore, when a "reproduction stop instruction" is issued by the music performance operation detection program 202, a process for stopping the reproduction is also executed.

In the data storage area 204, data such as operation data 205, the musical score data 209, the combined speed data 210, shaking direction data 211, reproduction start position data 212, position-being-reproduced data 213, a reset counter 214, and vigorousness value data 215, are stored, and various other kinds of data used for the game process are stored. For example, a flag indicating whether or not the note of the musical score is being currently reproduced is stored according to need.

The operation data 205 is operation data transmitted from the controller 7 to the game apparatus 3. The operation data 205 includes angular velocity data 206, acceleration data 207, and operation button data 208. The angular velocity data 206 represents an angular velocity detected by the angular velocity sensor 702. In the exemplary embodiment described herein, the angular velocity data 206 represents an angular velocity around each of three axes, that is, the XYZ axes, shown in FIG. 3. The acceleration data 207 represents an acceleration (an acceleration vector) detected by the acceleration sensor 701. In the exemplary embodiment described herein, the acceleration data 207 represents a three-dimensional acceleration vector containing, as its components, accelerations in three-axial directions, that is, the XYZ-axes directions; respectively, shown in FIG. 3. The operation button data 208 represents an input state of each of the operation buttons 72a to 72i.

The musical score data 209 represents sound data corresponding to the musical score as shown in FIG. 7. Namely, the musical score data 209 is data in which a sound row for the twelve strings of the harp 102 is defined. In FIG. 7, although the sound data is represented as the musical score for convenience of the description, the sound data may be represented in any form representing the same contents.

The combined speed data 210 is data calculated based on the angular velocity data 206 and the acceleration data 207 in the process executed by the music performance operation detection program 202. Further, in the process executed by the reproduction processing program 203, a reproduction speed for the musical score data 209 is determined based on the combined speed data 210.

The shaking direction data 211 represents a direction in which the controller 7 is being shaken, and is set, according to need, in the process executed by the music performance operation detection program 202. In the exemplary embodiment, a value indicating one of "rightward", "leftward", or "shaking is not performed" is set as the content of the shaking direction data 211.

Figure 11:
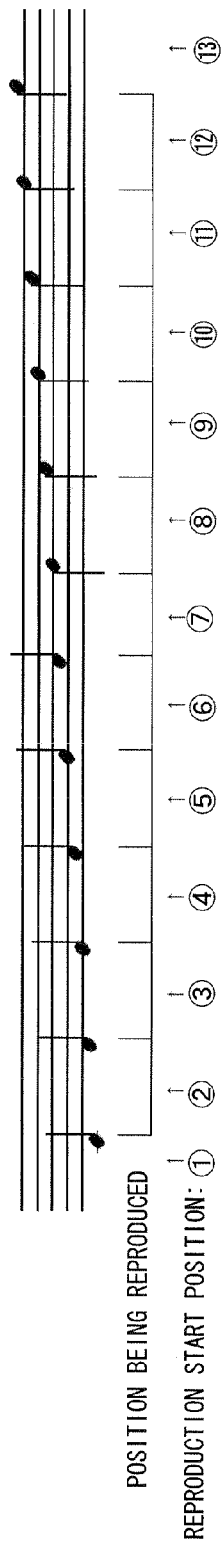
FIG. 11 shows non-limiting exemplary notions of a reproduction start position and a position-being-reproduced.

The reproduction start position data 212 represents a position in the musical score (a position on the musical score data 209) at which the reproduction is stared in the reproduction process executed by the reproduction processing program 203. The position-being-reproduced data 213 represents a position in the musical score (a position on the musical score data 209) at which a note is being currently reproduced in the reproduction process. FIG. 11 shows non-limiting exemplary notions of the reproduction start position and the position-being-reproduced. The musical score shown in FIG. 11 is the same as shown in FIG. 7, and twelve notes corresponding to the twelve strings of the harp 102 are indicated. The reproduction start position represents a position of a note from which the reproduction is started. In other words, the reproduction start position represents a position of a note to be reproduced for immediately following time. In the exemplary embodiment, as shown in FIG. 11, thirteen positions are defined in total. This is because two reproduction directions, i.e., the forward direction and the reverse direction, are used. Further, in the exemplary embodiment, as an initial value of the reproduction start position, the leftmost position shown in FIG. 11 is set to the reproduction start position data 212. In the process executed by the music performance operation detection program 202, the reproduction start position is updated so as to represent a content of another position (specifically, one of the rightmost position or the leftmost position) according to need. Further, while the notes of the musical score are being reproduced in the process executed by the reproduction processing program 203, the content of the reproduction start position data 212 is updated in the reproduction process according to need (in this process, the content of the reproduction start position data 212 is updated so as to indicate one of the first to the thirteenth positions). For example, when the leftmost note of the musical score shown in FIG. 11 is reproduced in the reproduction process, the reproduction start position is updated so as to shift from "the first" position, which represents the initial value, to "the second" position in the reproduction process. Further, the position-being-reproduced represents a position at which the reproduction is being currently performed, and is updated in real-time (for each frame) in the reproduction process executed by the reproduction processing program 203.

Returning to FIG. 10, the reset counter 214 is a variable used by the music performance operation detection program for setting the reproduction start position (one of the right end or left end). The counter is used for indicating a movement distance obtained when the controller 7 has been moved by a player without pressing the A button 72d.

The vigorousness value data 215 represents a value (hereinafter, referred to as a vigorousness value) indicating a vigorousness of shaking (magnitude of shaking) detected when the controller 7 is shaken by a player. The vigorousness value data 215 is calculated based on the combined speed data 210.

Next, the music performance process executed by the game apparatus 3 will be described in detail with reference to FIG. 12 to FIG. 17. When the game apparatus 3 is powered on, the boot program (not shown) stored in the ROM is executed by the CPU 10 of the game apparatus 3. Thus, the respective units such as the external main memory 12 are initialized. Subsequently, the game program stored in the optical disc 4 or the like is loaded to the external main memory 12, and the CPU 10 starts to execute the game program. In the progress of the game, a process described below is executed when the player object 101 holds the harp 102 at the ready as shown in FIG. 5 by a player performing a predetermined operation.

The processes shown in FIG. 12 to FIG. 17 are merely examples. In a case where the same results can be obtained, the order in which the respective steps are performed may be changed. Further, values of variables and threshold values used in determination process steps are merely examples.

Other values may be used according to need. Further, in the exemplary embodiment described herein, each process step in the flow charts shown in FIG. 12 to FIG. 17 is executed by the CPU 10. However, a part of the process steps in the flow charts shown in FIG. 12 to FIG. 17 may be executed by a processor or a dedicated circuit other than the CPU 10.

Figure 12:
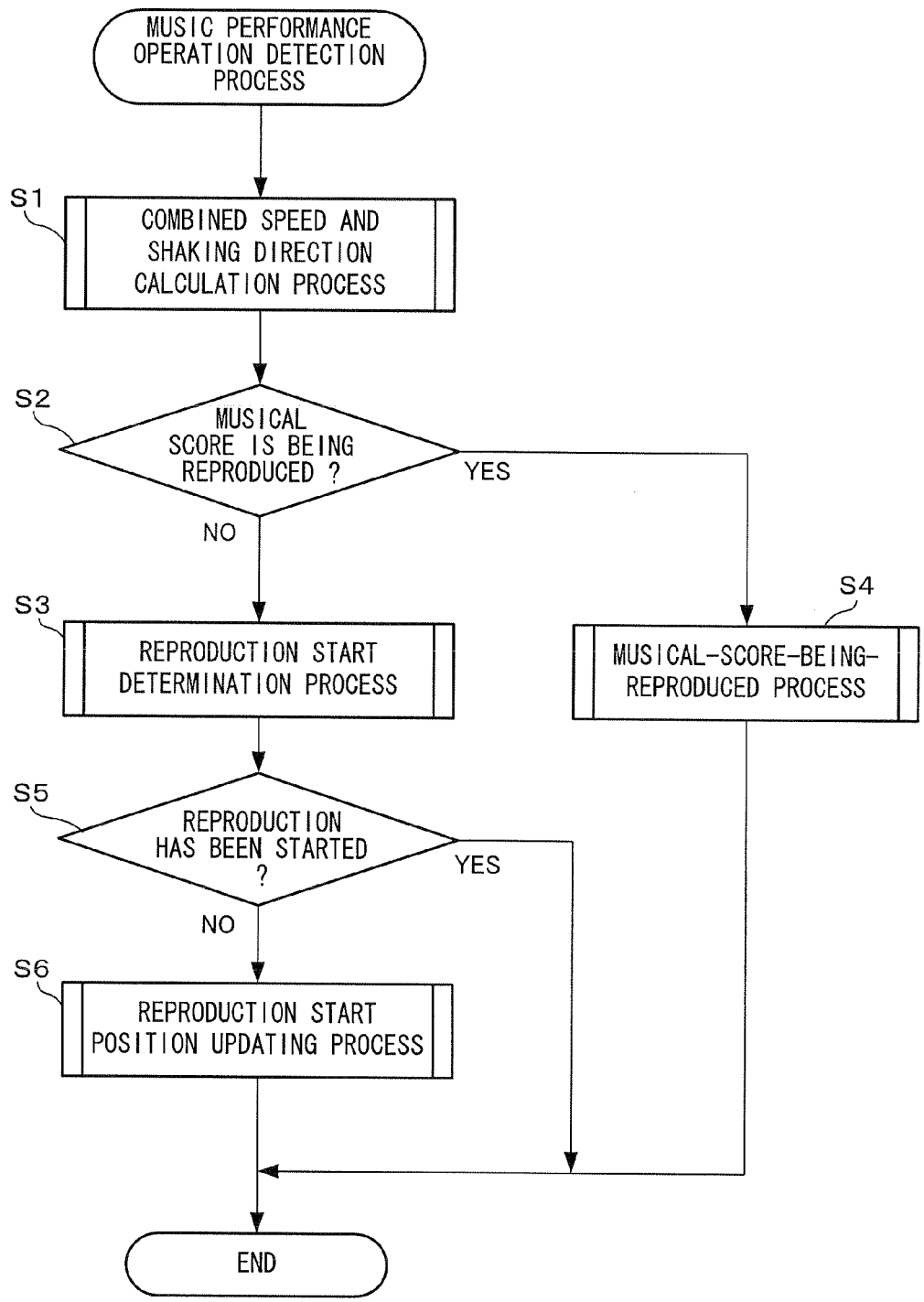
FIG. 12 is a flow chart showing in detail a non-limiting exemplary music performance operation detection process.

FIG. 12 is a flow chart showing in detail a non-limiting exemplary music performance operation detection process. In this process, a movement of the controller 7 is detected based on the acceleration data and the angular velocity data, to determine, for example, the reproduction start position, the reproduction speed, and the reproduction direction for the musical score data 209. Further, when conditions are satisfied, a process for issuing such an instruction as to cause the reproduction processing program 203 to execute start of reproduction or stop of reproduction, is also executed. The process of the flow chart is repeatedly performed for each frame.

Figure 13:
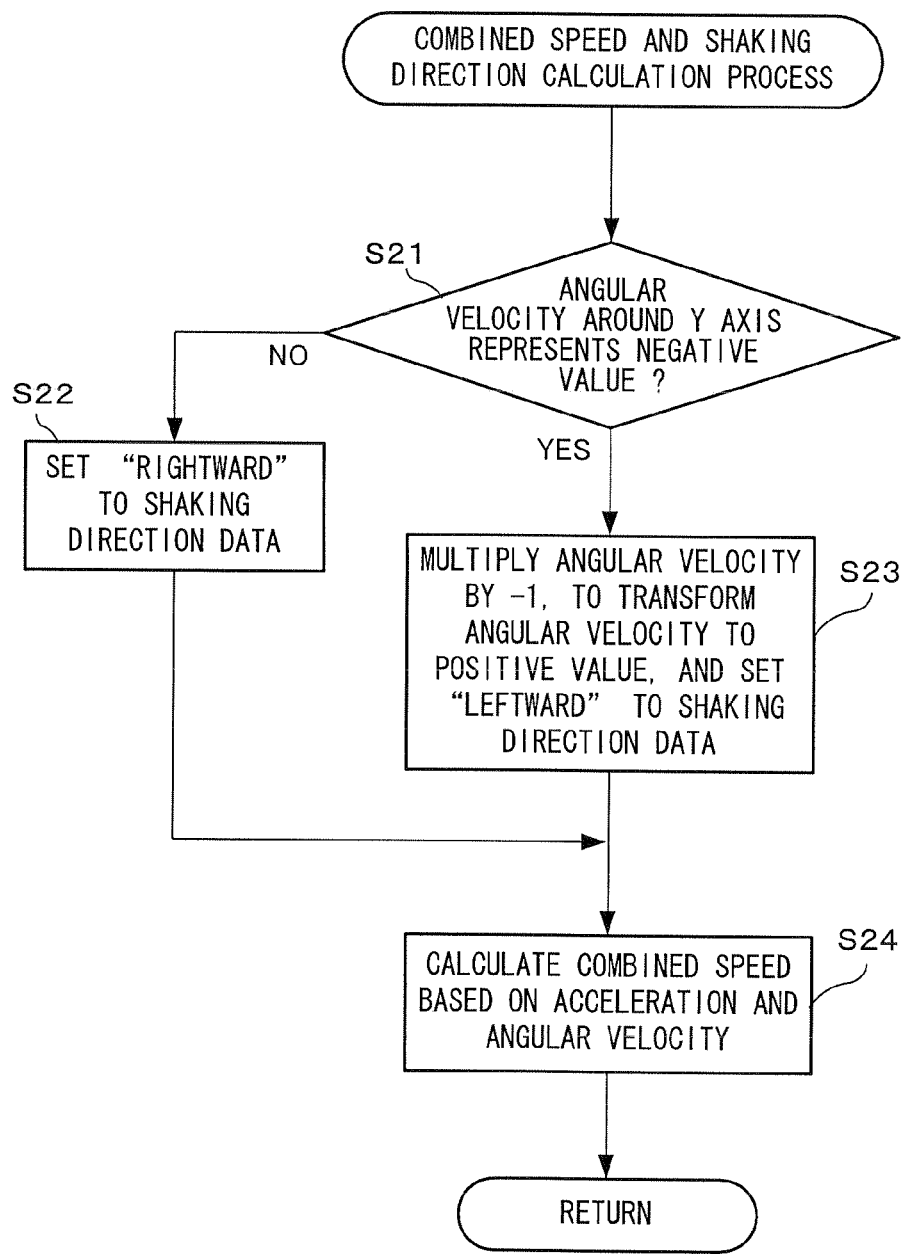
FIG. 13 is a flow chart showing in detail a non-limiting exemplary combined speed and shaking direction calculation process.

In FIG. 12, firstly, in step S1, the CPU 10 executes a combined speed and shaking direction calculation process. FIG. 13 is a flow chart showing in detail a non-limiting exemplary combined speed and shaking direction calculation process. In FIG. 13, firstly, in step S21, the CPU 10 determines whether a value (an angular velocity around the Y axis in the exemplary embodiment described herein) represented by the angular velocity data 206 is a negative value, with reference to the operation data 205. In the exemplary embodiment, when a rightward rotation around the Y axis is detected, a positive value is set to the angular velocity data 206 (a value representing an angular velocity around the Y axis), whereas when a leftward rotation around the Y axis is detected, a negative value is set to the angular velocity data 206.

When the result of the determination indicates that the angular velocity around the Y axis does not represent a negative value (NO in step S21), the CPU 10 sets the "rightward" to the shaking direction data 211 in step S22. On the other hand, when the angular velocity around the Y axis represents a negative value (YES in step S21), the CPU 10 multiplies the value of the angular velocity data by −1, to transform the value of the angular velocity data to a positive value, and sets the "leftward" to the shaking direction data 211, in step S23. Transformation to a positive value is for convenience sake in various calculation process steps subsequently performed.

Next, in step S24, the CPU 10 calculates a combined speed by using the acceleration data 207 and the angular velocity data 206, and stores the combined speed as the combined speed data 210 in the external main memory 12. In the exemplary embodiment described herein, on the assumption that the posture is as shown in FIG. 6, FIG. 8, and FIG. 9, an acceleration in only the X-axis direction in the local coordinate system of the controller 7 is used as the acceleration data 207. However, in another exemplary embodiment, an acceleration for another axis may be used, or a plurality of accelerations for, for example, the X-axis and the Y-axis may be used in combination. The process step of step S24 will be specifically described. The CPU 10 calculates the combined speed by using the following equations. Firstly, a corrected angular velocity is calculated by using the following equation.

$$\text{Corrected angular velocity} = \text{Angular velocity} \times \text{Angular velocity coefficient } A \qquad \text{Equation 1}$$

In the exemplary embodiment described herein, a fixed value is used as the angular velocity coefficient A.

Next, whether or not the angular velocity indicates a value greater than or equal to a predetermined threshold value C is determined, and, according to the result of the determination, an acceleration coefficient B is determined as follows.

(1) In a case where the angular velocity indicates a value greater than or equal to the threshold value C, $$\text{Acceleration coefficient } B = \text{Fixed value} \qquad \text{Equation 2}$$

(2) In a case where the angular velocity indicates a value less than the threshold value C, $$\text{Variable } D = (1.0 + \text{Threshold value } C) - \text{Angular velocity} \qquad \text{Equation 3}$$

$$\text{Acceleration coefficient } B = \text{Fixed coefficient } E \times (\text{Variable } D \times \text{Variable } D) \qquad \text{Equation 4}$$

Equation 3 and equation 4 are defined such that the less the angular velocity is, the greater the acceleration coefficient B is. Namely, it is assumed that the less the angular velocity is, the closer the movement of the controller 7 is to the second moving manner (parallel shift) as shown in FIG. 9. Therefore, the combined speed is determined such that the closer the movement of the controller 7 is to the second moving manner, the greater a rate at which an acceleration is used in the combined speed is.

Next, the corrected acceleration is calculated by using the following equation.

$$\text{Corrected acceleration} = \text{Acceleration} \times \text{Acceleration coefficient } B \qquad \text{Equation 5}$$

A combined speed F is calculated by using the following equation.

$$\text{Combined speed } F = \text{Corrected angular velocity} + \text{Corrected acceleration} \qquad \text{Equation 6}$$

The combined speed F having been thus calculated is set to and stored as the combined speed data 210 (the combined speed data 210 is updated when a value has been already stored as the combined speed data 210). As described above, the combined speed F is calculated such that the closer the movement of the controller 7 is to the second moving manner, the greater a rate at which the acceleration is used is (so as to relatively reduce a rate at which the angular velocity is used), whereas the closer the movement of the controller 7 is to the first moving manner, the less a rate at which the acceleration is used is (so as to relatively increase a rate at which the angular velocity is used). This is the end of the description for the combined speed and shaking direction calculation process.

Returning to FIG. 12, subsequently, in step S2, the CPU 10 determines whether or not the musical score data 209 is being currently reproduced. When the result of the determination indicates that the musical score data 209 is being reproduced (YES in step S2), a process step of step S4 described below is executed. On the other hand, when the result of the determination indicates that the musical score data 209 is not being reproduced (NO in step S2), the CPU 10 executes a reproduction start determination process of step S3.

Figure 14:
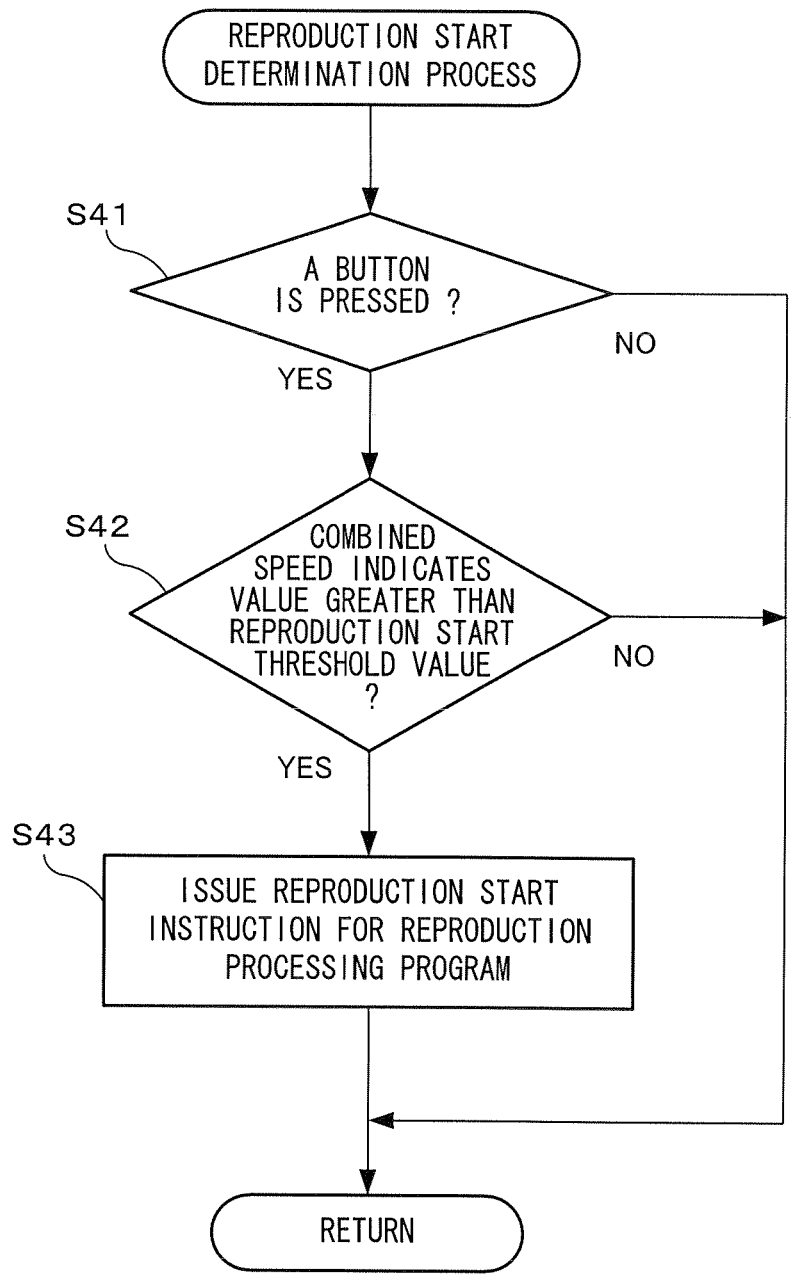
FIG. 14 is a flow chart showing in detail a non-limiting exemplary reproduction start determination process.

FIG. 14 is a flow chart showing in detail a non-limiting exemplary reproduction start determination process of step S3. Firstly, in step S41, the CPU 10 determines whether or not the A button 72d is pressed, with reference to the operation data 205. When the result of the determination indicates that the A button 72d is not pressed (NO in step S41), the reproduction start determination process is ended.

On the other hand, when the A button 72d is pressed (YES in step S41), the CPU 10 determines whether or not the combined speed F indicates a value greater than a reproduction start threshold value, with reference to the combined speed data 210, in the subsequent step S42. The reproduction start threshold value is a preset threshold value. When the result of the determination indicates that the combined speed indicates a value greater than the reproduction start threshold value (YES in step S42), the CPU 10 issues a reproduction start instruction in step S43 so as to cause the reproduction processing program 203 to execute a reproduction process. According thereto, in the reproduction process executed by the reproduction processing program 203, the reproduction of the musical score data 209 is started. At this time, in the reproduction process, a position in the musical score at which the reproduction is started is determined with reference to the reproduction start position data 212. Further, whether the reproduction direction is the forward direction or the reverse direction is also determined with reference to the shaking direction data 211. Further, the reproduction speed for the musical score data 209 is also determined based on the combined speed F with reference to the combined speed data 210. The reproduction of the musical score data 209 is started based on each element having been thus determined.

On the other hand, when the combined speed does not indicate a value greater than the reproduction start threshold value (NO in step S42), the process step of step S43 is skipped, and the reproduction start determination process is ended.

Returning to FIG. 12, subsequent to the reproduction start determination process, in step S5, the CPU 10 determines whether or not the reproduction of the musical score data 209 has been started, as a result of the reproduction start determination process. As a result, when the reproduction has been started (YES in step S5), the music performance operation detection process is ended. On the other hand, when the reproduction has not been started (NO in step S5), the CPU 10 executes a reproduction start position updating process of step S6. This process is executed in order to determine whether the reproduction start position is at the right end or the left end of the harp 102.

FIG. 15 is a flow chart showing in detail a non-limiting exemplary reproduction start position updating process of step S6. Firstly, in step S51, the CPU 10 determines whether or not the combined speed F indicates a value greater than a shaking determination threshold value (this value is preset), with reference to the combined speed data 210. When the result of the determination indicates that the combined speed F indicates a value greater than the shaking determination threshold value (YES in step S51), the CPU 10 subsequently determines, in step S52, whether or not a shaking direction detected in the most recent frame is the same as the shaking direction detected in the immediately preceding frame, with reference to the shaking direction data 211. For example, data representing a shaking direction detected in the immediately preceding frame is stored and updated in the external main memory 12 according to need, and the determination of step S52 is performed by comparison between the data for the most recent frame and the data for the immediately preceding frame. When the result of the determination indicates that the shaking direction detected in the most recent frame is not the same as the shaking direction detected in the immediately preceding frame (NO in step S52), the CPU 10 clears a value of the reset counter 214 to set the value of the reset counter 214 to zero in step S53. The reproduction start position updating process is then ended. On the other hand; when the shaking direction detected in the most recent frame is the same as the shaking direction detected in the immediately preceding frame (YES in step S52), the CPU 10 adds a value based on the combined speed F, to the reset counter 214, in step S54. Namely, a distance (movement distance) over which a player has moved the controller 7 in a period from the immediately preceding frame to the most recent frame is added. The greater a value of the combined speed F is, the greater a value added to the reset counter 214 is.

Subsequently, in step S55, the CPU 10 determines whether or not a value of the reset counter 214 is greater than a predetermined threshold value which has been preset. The threshold value is, for example, a value representing a distance from the end of the harp 102 to almost the center of the harp. When the result of the determination indicates that the value of the reset counter 214 is greater than the predetermined threshold value (YES in step S55), the CPU 10 sets an end position in the shaking direction having been most recently detected, to the reproduction start position data 212, in step S56. In the examples shown in FIG. 6 and FIG. 11, when the shaking direction of the controller 7 indicates leftward direction (in FIG. 6), the "thirteenth" position is set to the reproduction start position data 212 as the reproduction start position in FIG. 11. Further, when the shaking direction of the controller 7 indicates the rightward direction (in FIG. 6), the "first" position is set to the reproduction start position data 212 as the reproduction start position in FIG. 11. When the end position in the shaking direction for the most recent frame has been already set, this process may not be performed.

On the other hand, when the value of the reset counter 214 is not greater than the predetermined threshold value (NO in step 55), the process step of step S56 is skipped, and the reproduction start position updating process is ended.

When the result of the determination of step S51 indicates that the combined speed F does not indicate a value greater than the shaking determination threshold value (NO in step S51), the CPU 10 clears the value of the reset counter 214 so as to set the value of the reset counter 214 to zero in step S57. Further, in step S58, the CPU 10 sets, to the shaking direction data 211, a value indicating that "shaking is not performed". The reproduction start position updating process is then ended.

Returning to FIG. 12, after the reproduction start position updating process of step S6, the CPU 10 ends the music performance operation detection process.

Figure 16:
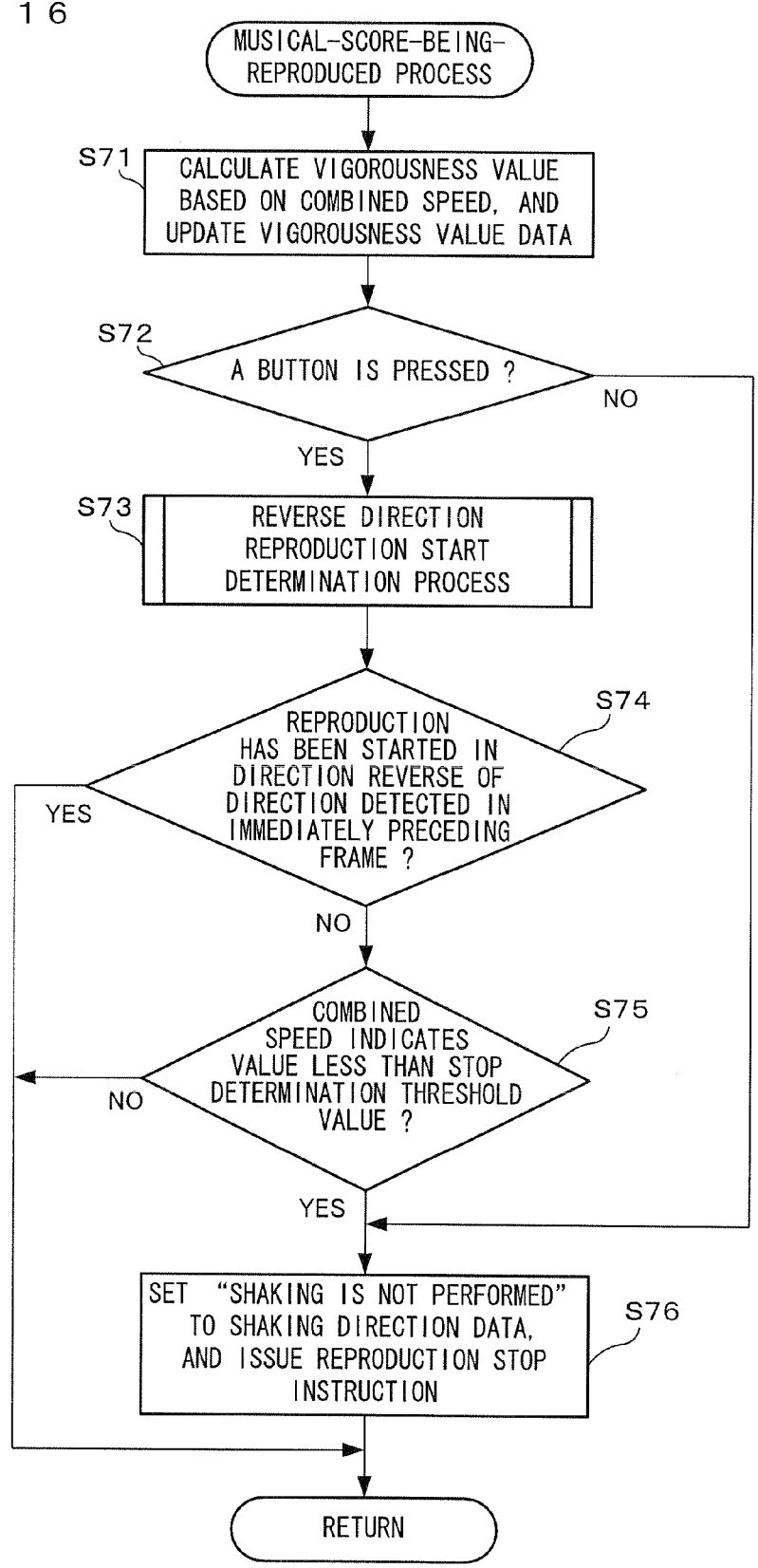
FIG. 16 is a flow chart showing in detail a non-limiting exemplary musical-score-being-reproduced process.

Next, a process step (step S4) performed when the result of the determination of step S2 indicates that the note of the musical score is being reproduced, will be described. FIG. 16 is a flow chart showing in detail a non-limiting exemplary musical-score-being-reproduced process of step S4. In FIG. 16, initially, in step S71, the CPU 10 calculates a vigorousness value based on the combined speed F with reference to the combined speed data 210, and stores the vigorousness value as the vigorousness value data 215 in the external main memory 12 (the vigorousness value data 215 is updated when a vigorousness value has been already stored). The vigorousness value represents a magnitude of a vigorousness of the shaking detected when a player shakes the controller 7. For example, in a case where a player vigorously shakes the controller 7, the vigorousness value is increased as compared to when the controller 7 is slowly shaken.

Next, in step S72, the CPU 10 determines whether or not the A button 72d is pressed, with reference to the operation data 205. When the result of the determination indicates that the A button 72d is not pressed (NO in step S72), the process is advanced to step S76 described below. On the other hand, when the A button 72d is pressed (YES in step S72), the CPU 10 executes a reverse direction reproduction start determination process in step S73. This process is executed in order to determine whether or not the direction in which the controller 7 is shaken has become opposite while the notes of the musical score are being reproduced, and to reverse, when the direction has become opposite, the reproduction direction for the musical score.

Figure 17:
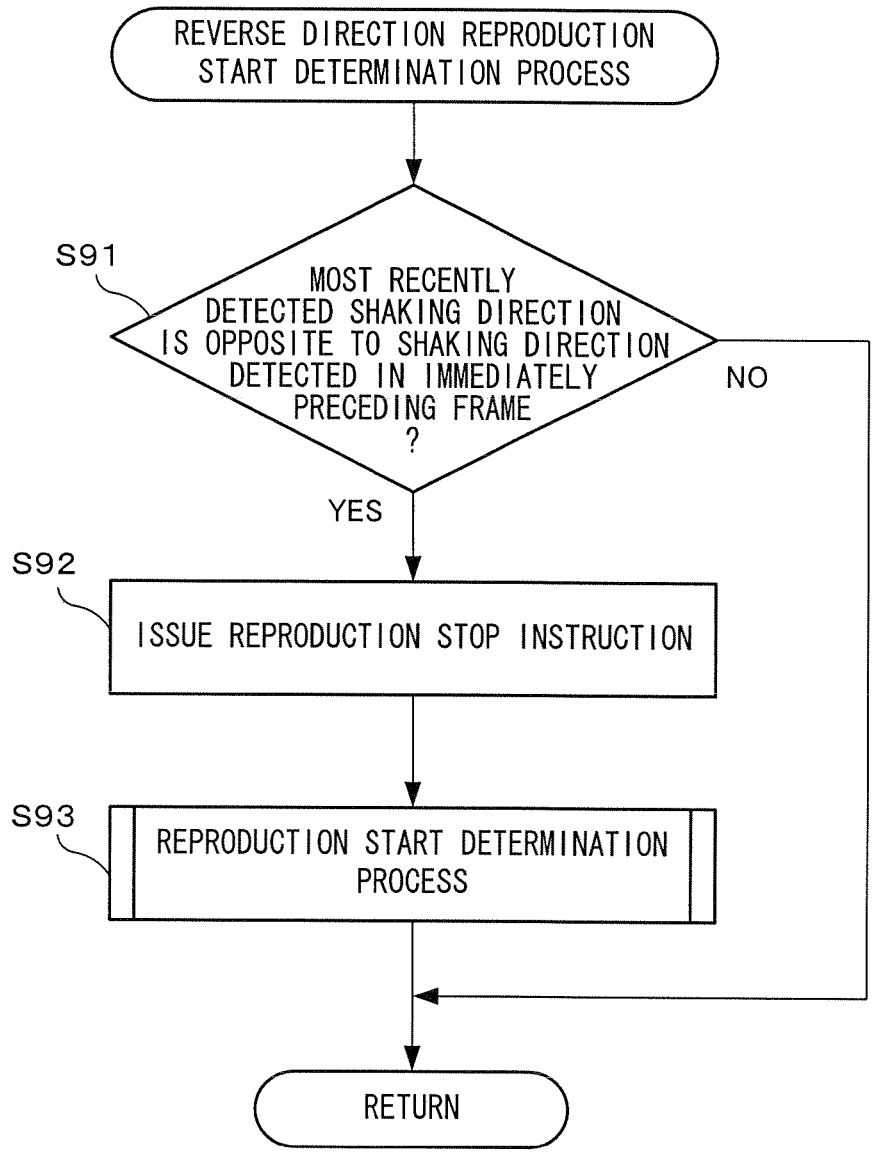
FIG. 17 is a flow chart showing in detail a non-limiting exemplary reverse direction reproduction start determination process.

FIG. 17 is a flow chart showing in detail a non-limiting exemplary reverse direction reproduction start determination process. In FIG. 17, firstly, in step S91, the CPU 10 determines whether or not the shaking direction detected in the most recent frame is opposite to the shaking direction detected in the immediately preceding frame, with reference to the shaking direction data 211. When the result of the determination indicates that the shaking direction is not the opposite direction (NO in step S91), the reverse direction reproduction start determination process is ended.

On the other hand, when the result of the determination indicates that the shaking direction detected in the most recent frame is the opposite direction (YES in step S91), the CPU 10 issues a reproduction stop instruction in step S92 so as to cause the reproduction processing program to stop the reproduction. According thereto, a process for stopping the reproduction in the reproduction process executed by the reproduction processing program 203 is executed. Specifically, a control is performed such that, although reproduction of the tone of the note being currently reproduced is made to the end, a tone of a note to be reproduced for the immediately following time, is not produced.

Subsequently, in step S93, the CPU 10 executes the reproduction start determination process. This process is the same as the process step of step S3 described above with reference to FIG. 12, and the description thereof is not given. As a result of this process, the reproduction process is started in a direction reverse of a direction for the immediately preceding frame. When the reproduction in the reverse direction is performed, reproduction of the tone of the note being currently reproduced is stopped at once, and the reproduction in the reverse direction is started. The reverse direction reproduction start determination process is then ended.

Returning to FIG. 16, subsequent to step S73, the CPU 10 determines, in step S74, whether or not, according to the result of the reverse direction reproduction start determination process, reproduction in a direction reverse of the reproduction direction detected in the immediately preceding frame, has been started. When the result of the determination of step S74 indicates that the reproduction in the reverse direction has been started (YES in step S74), the CPU 10 ends the musical-score-being-reproduced process.

On the other hand, when the reproduction in the reverse direction has not been started (namely, when the reproduction direction remains unchanged) (NO in step S74), whether or not the combined speed F indicates a value less than a stop determination threshold value, is determined in step S75. Namely, whether or not a hand of a player moving the controller 7 is stopped (whether or not the music performance has been stopped), is determined. When the result of the determination indicates that the combined speed F does not indicate a value less than the stop determination threshold value (when the music performance operation is continued) (NO in step S75), the CPU 10 ends the musical-score-being-reproduced process. As a result, the reproduction process by the reproduction processing program 203 is continued.

On the other hand, when the combined speed F indicates a value less than the stop determination threshold value (YES in step S75), the CPU 10 executes a process for stopping reproduction of the musical score data 209, in step S76. Specifically, the CPU 10 firstly sets a content indicating that "shaking is not performed" to the shaking direction data 211. Further, the CPU 10 issues a reproduction stop instruction so as to cause the reproduction processing program 203 executing the reproduction process in parallel to stop the reproduction. According thereto, a process for stopping the reproduction is executed in the reproduction process. At this time, a process is executed such that the vigorousness value data 215 is referred to in the reproduction process, and when the vigorousness value is greater than a predetermined threshold value, a position at which the reproduction is to be stopped is determined according to the vigorousness value. For example, in a case where the A button 72d is not pressed after the controller 7 is vigorously shaken, a process is executed such that sounds of some strings of the harp 102 are produced due to inertia based on the vigorousness, and the reproduction is then stopped. Further, when the vigorousness value is not greater than the predetermined threshold value, a control is performed such that, although reproduction of the tone of the note being currently reproduced is made to the end, a tone of a note to be reproduced for the immediately following time is not produced. Further, the reproduction speed used until the stop of the reproduction is determined based on the vigorousness value data 215, and the reproduction control based on the determined reproduction speed is performed.

After the process step of step S76, the musical-score-being-reproduced process is ended. This is the end of the detailed description of the music performance process according to the exemplary embodiment.

As described above, in the exemplary embodiment, output data from both the acceleration sensor and the angular velocity sensor is used to detect a movement of the controller 7. Reproduction of the musical score data is controlled based on the contents (such as a shaking speed and a shaking direction) of the movement of the controller 7. Thus, the process of reproducing the notes of the musical score can be executed according to the movement of the controller 7 with enhanced accuracy, and music performance operation which can be performed with enhanced minuteness can be provided to a player in, for example, a game in which the musical instrument is played.

Further, when a player vigorously shakes the controller 7, a control is performed such that even sounds in the sound row which are not to be reproduced usually (in the case of the vigorousness being small) are reproduced according to the vigorousness of the shaking. Thus, in a case where, for example, the controller 7 is slightly but vigorously shaken by utilizing snap of the player's wrist, sounds of all the strings (namely, the entirety of the musical score data 209) can be reproduced according to even a movement equivalent to a movement based on which sounds of only a few strings are reproduced in the case of the vigorousness being small. Therefore, the player can comfortably perform the music performance operation.

In the exemplary embodiment, the reproduction start position is set to one of the right end or the left end of the harp 102 (step S56). However, the setting of the reproduction start position is not limited thereto. A process of shifting the reproduction start position (shown in, for example, FIG. 11) to the immediately adjacent position one by one according to the direction in which the controller 7 is shaken, may be performed in the process step of step S56. In this case, each time the reproduction start position is shifted, the value of the reset counter 214 may be cleared so as to set the value of the reset counter 214 to zero.

Further, in the exemplary embodiment, only while the A button 72d is pressed, the note of the musical score is reproduced (tone is outputted). This is advantageous in that, for example, sound is reproduced also when the controller 7 is moved at a low speed (in other words, the reproduction can be started even when the controller 7 is moved at a very low speed). However, this is merely an example. The process may be executed without using the condition that a button such as the A button 72d is pressed. Namely, once the music performance can be performed by the player object 101 holding the harp 102 at the ready (see FIG. 5), the reproduction process as described above may be constantly executed according to the movement of the controller 7 until this state is cancelled.

Further, instead of the condition that the A button 72d is pressed as described above, another condition for reproduction may be used. For example, countdown is displayed on a screen, and when the countdown gets to zero, it may be determined that a condition for enabling the reproduction has been satisfied. Alternatively, a predetermined condition (for example, reproduction can be performed when a specific area is entered) in the game process may be utilized.

Further, in the exemplary embodiment, as the musical score data, data (representing a scale) in which a sound row for the strings of the harp 102 is set to the musical score as it is, is used. However, the sound row for the strings of the harp may not be used. For example, in light of uncomfortableness in music performance operation being reduced, one note in the musical score is preferably set so as to correspond to one string. However, for example, some notes may be set so as to correspond to one string, thereby reproducing a normal music (melody). Also in this case, the reproduction speed, the reproduction direction, and the reproduction start position are determined in the same manner as described for the above process. Therefore, in a case where a certain musical score (a music based on a certain musical score) is reproduced, various music performance operations can be performed according to the movement of the controller 7.

Further, the musical score data 209 representing plural types of musical scores may be prepared, and the musical score data 209 to be used may be changed according to a scene in which the harp 102 is played. Further, the musical instrument to be played is not limited to the harp. The technique of the exemplary embodiment is applicable to general stringed instruments. Further, the technique of the exemplary embodiment is applicable to any case in which a process of reproducing predetermined music data (musical score data) based on the movement of the controller 7 as described above can be performed, as well as to a case in which musical instruments such as the stringed instruments can be used. Moreover, in the exemplary embodiment described above, an exemplary process is described in which a music is reproduced (the musical instrument is played) by using the game apparatus as an exemplary information processing apparatus. However, needless to say, the technique of the exemplary embodiment is applicable to a process of reproducing, for example, a moving picture based on the movement of the controller 7 as well as to the process of reproducing the music data.

Furthermore, each of the reproduction start determination process, the reproduction start position updating process, and the musical-score-being-reproduced process includes a process step of comparing between the combined speed and the predetermined threshold value (step S42, step S51, step S75). However, prior to these determination process steps, at least one of a process step of comparing between the acceleration data and a predetermined threshold value, and a process step of comparing between the angular velocity data and a predetermined threshold value may be executed. These process steps are performed in order to prevent a state in which, for example, although a hand of a player is stopped (the controller 7 is not moved), it is determined that the combined speed F is greater than the reproduction start threshold value in step S42, and a sound is produced, due to, for example, error in calculation process, in, for example, the reproduction start determination process. Namely, whether or not the controller 7 is being moved is determined by using the acceleration data only prior to the determination process with the use of the combined speed, and the same determination is further performed by using the angular velocity data only, so that whether or not the controller 7 is being actually moved can be determined with enhanced accuracy. Thus, a state in which an actual movement of the controller 7 and control for reproducing sound and stopping the reproduction do not match each other due to error in calculation process and the like (in particular, in the case of the movement of the controller 7 being small), can be prevented.

Further, in the exemplary embodiment described above, in the process executed by the reproduction processing program 203, a reproduction speed for the musical score is changed according to the combined speed calculated for each frame. However, only when a reproduction speed is increased as compared to in the immediately preceding frame, reproduction speed may be changed. In a case where a reproduction speed is changed accurately also when the reproduction speed is decreased, intervals at which the sound is reproduced vary especially when a player is slowly shaking the controller 7, so that the music performance operation may not be comfortably performed. In other words, only when the reproduction speed is increased, the reproduction speed is changed, so that intervals at which the sound of the harp is reproduced can be as regular as possible, thereby preventing a player from minding variation in sound reproduction interval. Moreover, in order to reduce variation in sound reproduction interval, for example, an average of values of the combined speeds obtained in some preceding frames may be used to change the reproduction speed.

Further, in the exemplary embodiment described above, a series of process steps of playing the harp 102 based on the orientation of the controller 7 is executed by a single apparatus (the game apparatus 3). However, in another exemplary embodiment, the series of process steps may be executed by an information processing system including a plurality of information processing apparatuses. For example, in the information processing system including a terminal-side apparatus, and a server-side apparatus capable of communicating with the terminal-side apparatus via a network, a part of the series of process steps described above may be executed by the server-side apparatus. Further, in the information processing system including a terminal-side apparatus, and a server-side apparatus capable of communicating with the terminal-side apparatus via a network, a main part of the series of process steps described above may be executed by the server-side apparatus, and another part of the series of process steps described above may be executed by the terminal-side apparatus. Further, in the information processing system described above, a system on the server side includes a plurality of information processing apparatuses, and a process steps to be executed on the server side may be shared by the plurality of information processing apparatuses.

While certain example systems, methods, devices, and apparatuses have been described herein, the foregoing description is in all aspects illustrative and not restrictive. It is to be understood that numerous other modifications and variations can be devised without departing from the scope of the appended claims.

What is claimed is:
1. A non-transitory computer-readable storage medium having stored therein an information processing program executed by a computer of an information processing apparatus that performs processing based on an input from an input device including an acceleration sensor and an angular velocity sensor, the computer being caused to perform:

setting a combined speed indicating a speed based on a movement of the input device, by using acceleration data outputted by the acceleration sensor, and angular velocity data outputted by the angular velocity sensor; and executing a predetermined process based on the combined speed having been set by the combined speed setting, wherein the combined speed setting changes a rate of the acceleration data to be used in the combined speed, according to a magnitude of an angular velocity represented by the angular velocity data, to set the combined speed.

2. The non-transitory computer-readable storage medium having stored therein the information processing program according to claim 1, wherein the combined speed setting sets the combined speed such that the less a value of the angular velocity data is, the greater a rate of the acceleration data to be used in the combined speed is.

3. The non-transitory computer-readable storage medium having stored therein the information processing program according to claim 1, wherein the information processing program causes the computer to further perform storing music data to be reproduced, and the executing a predetermined process includes reproducing the music data based on the combined speed having been set by the combined speed setting.

4. The non-transitory computer-readable storage medium having stored therein the information processing program according to claim 3, wherein the information processing program causes the computer to further perform setting a reproduction start position of the music data, based on the acceleration data and the angular velocity data, and the reproduction controller starts to reproduce the music data from the reproduction start position having been set.

5. The non-transitory computer-readable storage medium having stored therein the information processing program according to claim 4, wherein the reproduction start position setting sets, as the reproduction start position, one of a start end of the music data and a finish end of the music data.

6. The non-transitory computer-readable storage medium having stored therein the information processing program according to claim 4, wherein the reproduction start position setting sets the reproduction start position based on the combined speed.

7. The non-transitory computer-readable storage medium having stored therein the information processing program according to claim 3, wherein the information processing program causes the computer to further perform setting a reproduction direction of the music data, based on the acceleration data and the angular velocity data, and the reproducing reproduction controller reproduces the music data in the reproduction direction having been set by the reproduction direction setting.

8. The non-transitory computer-readable storage medium having stored therein the information processing program according to claim 3, wherein the reproducing the music data includes setting a reproduction speed at which the music data is reproduced, based on the combined speed.

9. The non-transitory computer-readable storage medium having stored therein the information processing program according to claim 8, wherein the combined speed setting repeatedly sets the combined speed, and the reproduction speed setting repeatedly sets the reproduction speed, based on the combined speed that is repeatedly set.

10. The non-transitory computer-readable storage medium having stored therein the information processing program according to claim 9, wherein the reproduction speed setting sets the reproduction speed only when the reproduction speed that is set based on the combined speed is increased.

11. The non-transitory computer-readable storage medium having stored therein the information processing program according to claim 3, wherein the information processing program causes the computer to further perform reproduction stop determination for determining whether or not reproduction of the music data being reproduced is to be stopped, based on the acceleration data and the angular velocity data, and the reproduction controller determines, when the reproduction stop determination determines that the reproduction of the music data is to be stopped, a reproduction stop position on the music data, based on the acceleration data and the angular velocity data, and stops the reproduction at the reproduction stop position having been determined.

12. The non-transitory computer-readable storage medium having stored therein the information processing program according to claim 3, wherein the information processing program causes the computer to further perform reproduction condition determination for determining whether or not a predetermined condition for reproducing a music is satisfied, and the reproduction controller reproduces the music data while the reproduction condition determination determines that the predetermined condition is satisfied.

13. The non-transitory computer-readable storage medium having stored therein the information processing program according to claim 12, wherein the input device further includes a predetermined input section, the reproduction condition determination determines whether or not the input is performed on the predetermined input section, and the reproduction controller reproduces the music data while the reproduction condition determination determines that the input is performed on the predetermined input section.

14. The non-transitory computer-readable storage medium having stored therein the information processing program according to claim 3, wherein the music data is data representing a musical score in which predetermined sounds are provided at regular intervals.

15. An information processing apparatus that reproduces a music based on an input from an input device including an acceleration sensor and an angular velocity sensor, the information processing apparatus comprising:

a combined speed setting section configured to set a combined speed indicating a speed based on a movement of the input device, by using acceleration data outputted by the acceleration sensor, and angular velocity data outputted by the angular velocity sensor; and a processor configured to execute a predetermined process based on the combined speed having been set by the combined speed setting section, wherein the combined speed setting section changes a rate of the acceleration data to be used in the combined speed, according to a magnitude of an angular velocity represented by the angular velocity data, to set the combined speed.

16. An information processing system that reproduces a music based on an input from an input device including an acceleration sensor and an angular velocity sensor, the information processing system comprising:

a combined speed setting section configured to set a combined speed indicating a speed based on a movement of the input device, by using acceleration data outputted by the acceleration sensor, and angular velocity data outputted by the angular velocity sensor; and a processor configured to execute a predetermined process based on the combined speed having been set by the combined speed setting section, wherein the combined speed setting section changes a rate of the acceleration data to be used in the combined speed, according to a magnitude of an angular velocity represented by the angular velocity data, to set the combined speed.

17. An information processing control method for controlling one of an information processing apparatus and an information processing system that reproduces a music based on an input from an input device including an acceleration sensor and an angular velocity sensor, the information processing control method comprising:

setting a combined speed indicating a speed based on a movement of the input device, by using acceleration data outputted by the acceleration sensor, and angular velocity data outputted by the angular velocity sensor; and causing the information processing apparatus to execute a predetermined process based on the combined speed having been set by the combined speed setting, wherein the combined speed setting changes a rate of the acceleration data to be used in the combined speed, according to a magnitude of an angular velocity represented by the angular velocity data, to set the combined speed.

* * * * *